United States Patent
You

(10) Patent No.: US 10,134,280 B1
(45) Date of Patent: Nov. 20, 2018

(54) VEHICULAR NOTIFICATIONS

(71) Applicant: Taehyun You, Berkeley, CA (US)

(72) Inventor: Taehyun You, Berkeley, CA (US)

(*) Notice: Subject to any disclaimer, the term of this patent is extended or adjusted under 35 U.S.C. 154(b) by 0 days.

(21) Appl. No.: 15/409,021

(22) Filed: Jan. 18, 2017

Related U.S. Application Data

(60) Provisional application No. 62/298,690, filed on Feb. 23, 2016.

(51) Int. Cl.
| | |
|---|---|
| *G08G 1/16* | (2006.01) |
| *B60Q 1/00* | (2006.01) |
| *B60Q 1/32* | (2006.01) |
| *B60Q 1/34* | (2006.01) |
| *B60Q 1/46* | (2006.01) |
| *B60Q 1/50* | (2006.01) |
| *B60Q 1/44* | (2006.01) |

(52) U.S. Cl.
CPC ............ *G08G 1/161* (2013.01); *B60Q 1/0023* (2013.01); *B60Q 1/323* (2013.01); *B60Q 1/34* (2013.01); *B60Q 1/44* (2013.01); *B60Q 1/46* (2013.01); *B60Q 1/50* (2013.01)

(58) Field of Classification Search
CPC ............ B60R 2300/50; B60R 2300/80; B60R 2300/8033; B60R 2300/8093; G08G 1/161; G08G 1/164; G08G 1/166; G08G 1/167; B60Q 1/0023; B60Q 1/323; B60Q 1/34; B60Q 1/44; B60Q 1/46; B60Q 1/50; G06K 7/00791–7/00805
USPC ........ 340/903, 905, 435; 701/300, 301, 400, 701/408, 431, 433; 348/148, 149
See application file for complete search history.

(56) References Cited

U.S. PATENT DOCUMENTS

| | | | |
|---|---|---|---|
| 6,014,601 A | 1/2000 | Gustafson | |
| 6,184,791 B1 | 2/2001 | Baugh | |
| 6,733,134 B2 * | 5/2004 | Bleiner | B60Q 1/52 116/28 R |
| 6,859,148 B2 | 2/2005 | Miller et al. | |

(Continued)

FOREIGN PATENT DOCUMENTS

JP    2015132707 A  *  7/2015  ............... B60Q 1/50

OTHER PUBLICATIONS

YouTube; BMW Audi Laser Headlights; https://www.youtube.com/watch?v=-WvK5WC4ns0; published Jan. 7, 2015; (2 pgs.).

(Continued)

*Primary Examiner* — Thomas Mullen
(74) *Attorney, Agent, or Firm* — DLA Piper LLP (US)

(57) ABSTRACT

Systems and methods here utilize various light projecting technologies to inform other drivers of nearby vehicles of information which may allow for safer driving. In some embodiments, the projecting technologies may be used to project laser light onto a driving surface when a vehicle indicates a lane change, to show their intended physical location on the driving surface. In some embodiments, a parked vehicle may indicate a door is about to be opened, by projecting a warning and physical space where the door may swing open, onto the driving surface for other drivers to see. In some embodiments, sensors such as cameras, infra-red and/or radar to locate nearby vehicles, predict their position, and indicate where the vehicle will physically be located in a turn, lane change, or passing situation.

14 Claims, 20 Drawing Sheets

(56) References Cited

U.S. PATENT DOCUMENTS

| | | | |
|---|---|---|---|
| 7,192,172 B1* | 3/2007 | Alberti | B60R 1/1207 |
| | | | 362/259 |
| 7,782,184 B2* | 8/2010 | Wittorf | G08G 1/166 |
| | | | 340/435 |
| 8,195,394 B1 | 6/2012 | Zhu et al. | |
| 8,260,536 B2 | 9/2012 | Stefani | |
| 8,384,782 B2 | 2/2013 | Hiroshi | |
| 8,514,100 B2 | 8/2013 | Yamashita | |
| 8,655,537 B2 | 2/2014 | Ferguson et al. | |
| 8,825,259 B1 | 9/2014 | Ferguson | |
| 8,954,217 B1 | 2/2015 | Montemerlo et al. | |
| 8,985,652 B1 | 3/2015 | Switkes et al. | |
| 9,196,164 B1 | 11/2015 | Urmson et al. | |
| 9,235,850 B1 | 1/2016 | Erat et al. | |
| 9,248,835 B2 | 2/2016 | Tanzmeister | |
| 2010/0017111 A1* | 1/2010 | Stefani | B60Q 1/50 |
| | | | 701/533 |
| 2010/0253541 A1* | 10/2010 | Seder | G08G 1/0962 |
| | | | 340/905 |
| 2012/0044090 A1* | 2/2012 | Kahler | B60Q 1/50 |
| | | | 340/905 |
| 2014/0028980 A1* | 1/2014 | Othmer | B60Q 1/50 |
| | | | 353/14 |
| 2014/0049384 A1* | 2/2014 | Mueller | G08G 1/162 |
| | | | 340/435 |
| 2014/0055252 A1 | 2/2014 | Ascencio | |
| 2014/0303827 A1 | 10/2014 | Dolgov et al. | |
| 2015/0203023 A1* | 7/2015 | Marti | B60R 1/00 |
| | | | 340/425.5 |
| 2016/0207448 A1* | 7/2016 | Galicia Badillo | B60Q 1/323 |

OTHER PUBLICATIONS

Slash Gear; How Mercedes' F-15 self-driving car is shaping smart cities; https://www.slashgear.com/how-mercedes-f-015-self-driving-car-is-shaping-smart-cities-20374602/; dated Mar. 20, 2015; (14 pgs.).

YouTube; New Mercedes Digital Light—Revolution!!!; https://www.youtube.com/watch?v=XJHpD70fXME; published Dec. 3, 2016; (3 pgs.).

* cited by examiner

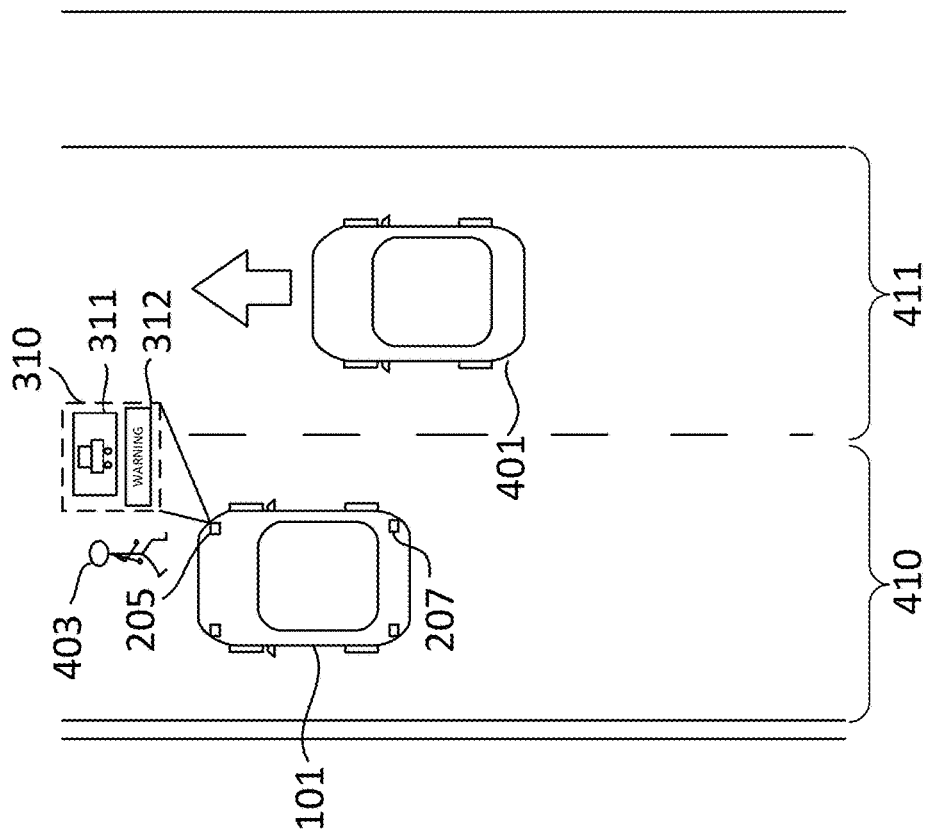

VEHICULAR NOTIFICATIONS

CROSS REFERENCE TO RELATED CASES

This application claims priority from U.S. Provisional application 62/298,690 filed 23 Feb. 2016, the entirety of which is hereby incorporated by reference.

TECHNICAL FIELD

The present invention relates generally to safety support of vehicles, sensors, and projectors.

BACKGROUND

Current safety technology regarding vehicle driving support systems, such as collision and blind spot warning systems, have generally been centered around only alerting the driver or computer system in autonomous, semi-autonomous, or conventional vehicles that contain collision and/or blind spot warning technology. The vehicles defined herein may be autonomous, semi-autonomous, and conventional vehicles, such as but not limited to, cars, trucks, buses, motorcycles, electric scooters, hover boards, Segways, and any other personal transportation vehicles or devices. Road users herein include pedestrians; two-wheeler users, such as: bicyclists or cyclists, one-wheeler users, such as single-wheel scooters or electric unicycles; and any other vehicle or device that may aid in mobility through, but not limited to, wheels, magnetic levitation, or aerial transportation. The current signaling features of a vehicle, such as turn signals for turning or lane changing, brake lights for decreasing in speed or stopping, or backup lights for reverse driving, provide limited insight to other road vehicles and users regarding more complex situations that occur on the road. In complex situations such as: a pedestrian crossing a road in a blind spot zone or lane changes when there is a possible blind spot, these systems do not provide sufficient information to the source vehicle, other vehicles, or road users. These limitations may cause potentially hazardous accidents to arise in certain instances, such as a pedestrian crossing on a crosswalk with or without a traffic light, in a blind spot zone to a vehicle.

For example, if a pedestrian is crossing on a crosswalk with or without a traffic light, the pedestrian may be unseen if they are in a blind spot or being blocked by objects, which may include the source vehicle itself, other vehicles, and/or users of the road. The only signal the first vehicle that sees the pedestrian can give to other road vehicles is their brake lights, which can have multiple meanings and does not solely signify that a pedestrian is crossing.

Moreover, this invention addresses the aspect of safety regarding autonomous and semi-autonomous vehicles. With the advancement of technology, autonomous and semiautonomous vehicles may become widely used by the population. Autonomous vehicles and semi-autonomous vehicles may provide a means of mobility to segments of the population that do not have or no longer have a personal driver's license: the children and the elderly. However, the absence of a conventional driver in autonomous and semi-autonomous vehicles may decrease risk perception and hazard detection by passengers in the vehicle. For example, in a conventional vehicle, when a passenger intends to get out of the vehicle and a bicyclist is approaching from behind, a conventional driver may be able to alert the passenger regarding the incoming bike. However, the absence of a conventional driver fails to alert passengers, such as: children, the elderly, and the disabled, who may have a lower sense of risk perception and hazard detection when on/off the road. This present invention addresses the need for a system that alerts passengers in autonomous and semi-autonomous vehicles, as the driver would do in conventional vehicles.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 4A and 4B are an example of a signaling device in an operating scenario, when an object intending to cross a road, as described in this disclosure.

DETAILED DESCRIPTION

Figure 1:
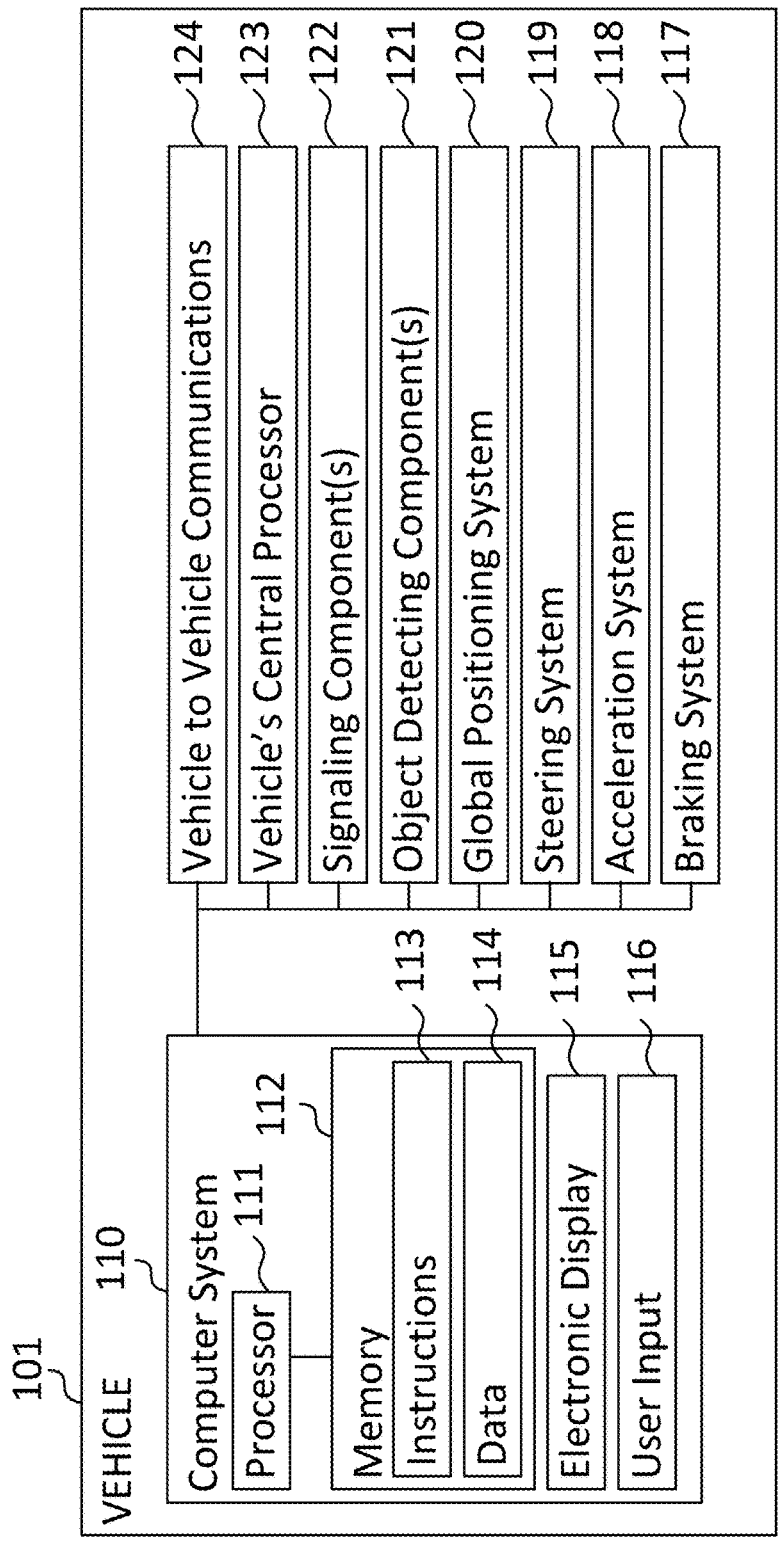
FIG. 1 is a block diagram of the systems of the vehicle, in accordance with the elements of this disclosure.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

OVERVIEW

Vehicles of any sort are designed to transport people and things from one place to another efficiently and safely. But when many vehicles move in close proximity to one another, potential collisions may occur, between and among vehicles as well as other objects moving or about to move around the vehicles such as pedestrians. This is true for cars driven by humans and driverless or autonomous cars, both partially or fully autonomous.

Additionally, drivers of vehicles today face increasing distractions from radios, smartphones, complicated user interfaces on dashboards, as well as phone calls and any human or pet distractions from within the vehicle. Systems and methods here utilize various light projecting technologies to inform other drivers or computer systems of nearby vehicles, that may be autonomous, semi-autonomous, or conventional vehicles, of information which may allow for safer driving. In some embodiments, the projecting technologies may be used to project light(s) onto a driving surface when a vehicle indicates a lane change, to show their intended physical location on the driving surface. In some embodiments, a parked vehicle may sense that a user is touching a door handle and then indicate a door is about to be opened, by projecting a warning and physical space where the door may swing open, onto the driving surface for other drivers or computer systems to see or scan. In some embodiments, sensors such as cameras, infrared, and/or radars locate nearby vehicles, predict their position, and indicate where nearby vehicles will physically be located in a turn, lane change, or passing situation. These and other safety feature examples are explored in more detailed below.

SAFETY

The systems and methods here relate generally to safety support of those operating vehicles and those nearby vehicles to better sense environments and inform those around a vehicle so safe practices may occur. This may be merely information sharing such as indicating a lane change with a projected image, or it may be a sophisticated data sharing among vehicles that allow autonomous vehicles to avoid collisions. In any of various combinations, the safety systems and methods here may be used to protect and inform: 1) vehicles, which can include autonomous, semi-autonomous, and conventional vehicles, such as but not limited to: cars, trucks, buses, motorcycles, electric scooters, hover boards, Segways, and any other personal transportation vehicles or devices, 2) road users not limited to pedestrians, two-wheeler users, such as: bicyclists or cyclists, one-wheeler users, such as: single-wheel scooters or electric unicycles, 3) machines used for agriculture such as lawn mowers or tractors, 4) machines using aerial transportation such as airplanes, helicopters, or drones and 5) any other vehicle, machine or device that can be mobilized, through, but not limited to, wheels, magnetic levitation, or aerial transportation, using signaling devices or modules, in instances such as: driving or parking.

COMPUTER EXAMPLES

Figure 12:
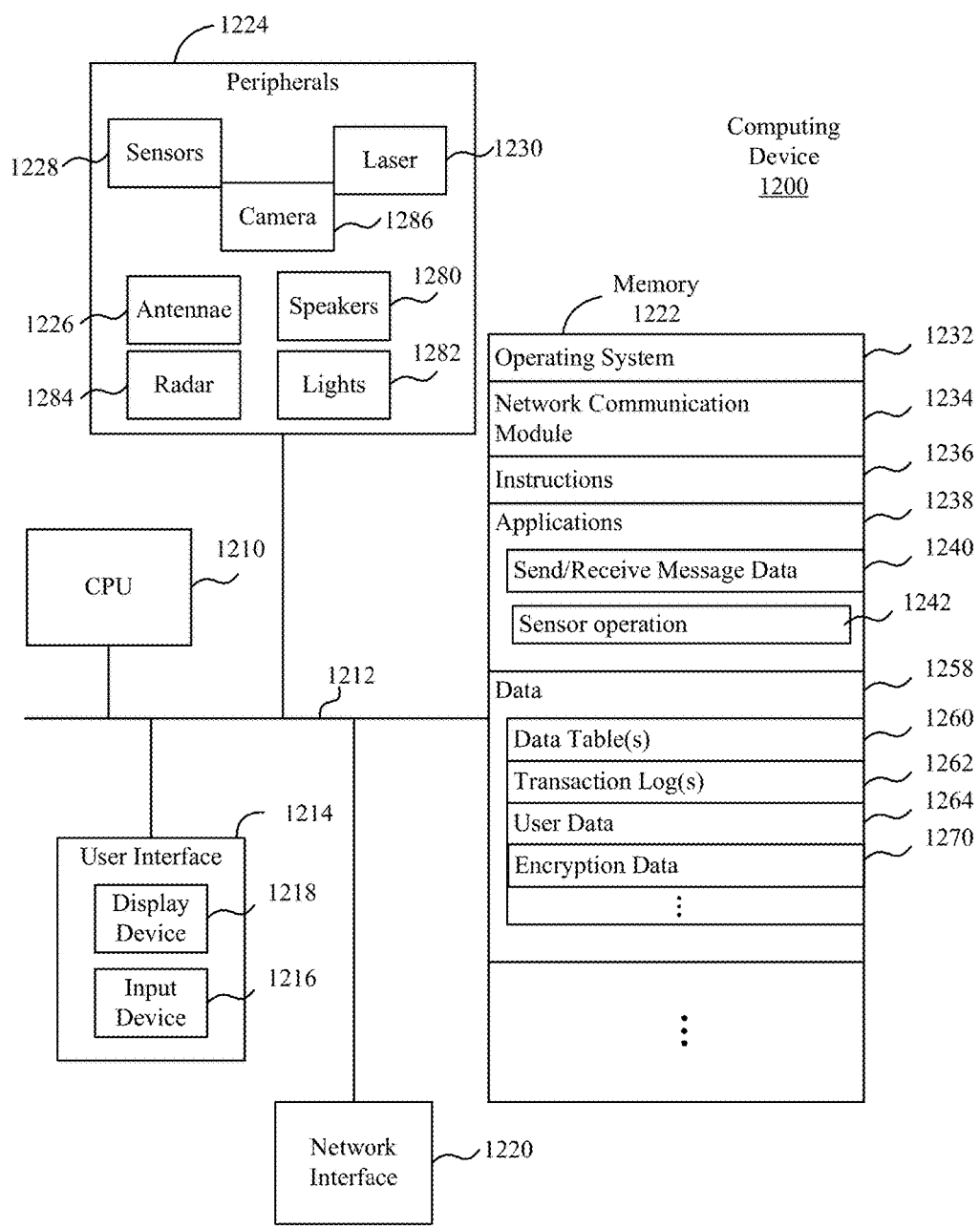
FIG. 12 shows an example computer hardware arrangement which may be used to practice the embodiments according to the elements of this disclosure.

In many example embodiments described here, a computer system may be used in a vehicle to receive sensor data, interpret sensor data, receive commands from a driver, interpret commands from a driver, send and receive communications regarding sensed data and command data, send direction to signaling devices, and/or integrate the information into driving commands for an autonomous or semi-autonomous vehicle. Such computer systems may be dedicated systems that operate as a peripheral to the overall vehicle system, or they may be partially or fully integrated into the other vehicle functionality and systems. Many various communication systems, sensors and signaling systems may be integrated as part of the overall computer system as described here. FIG. 12 below describes features of some computing systems that may be used as part of or to implement the design features described here.

Figure 2A:
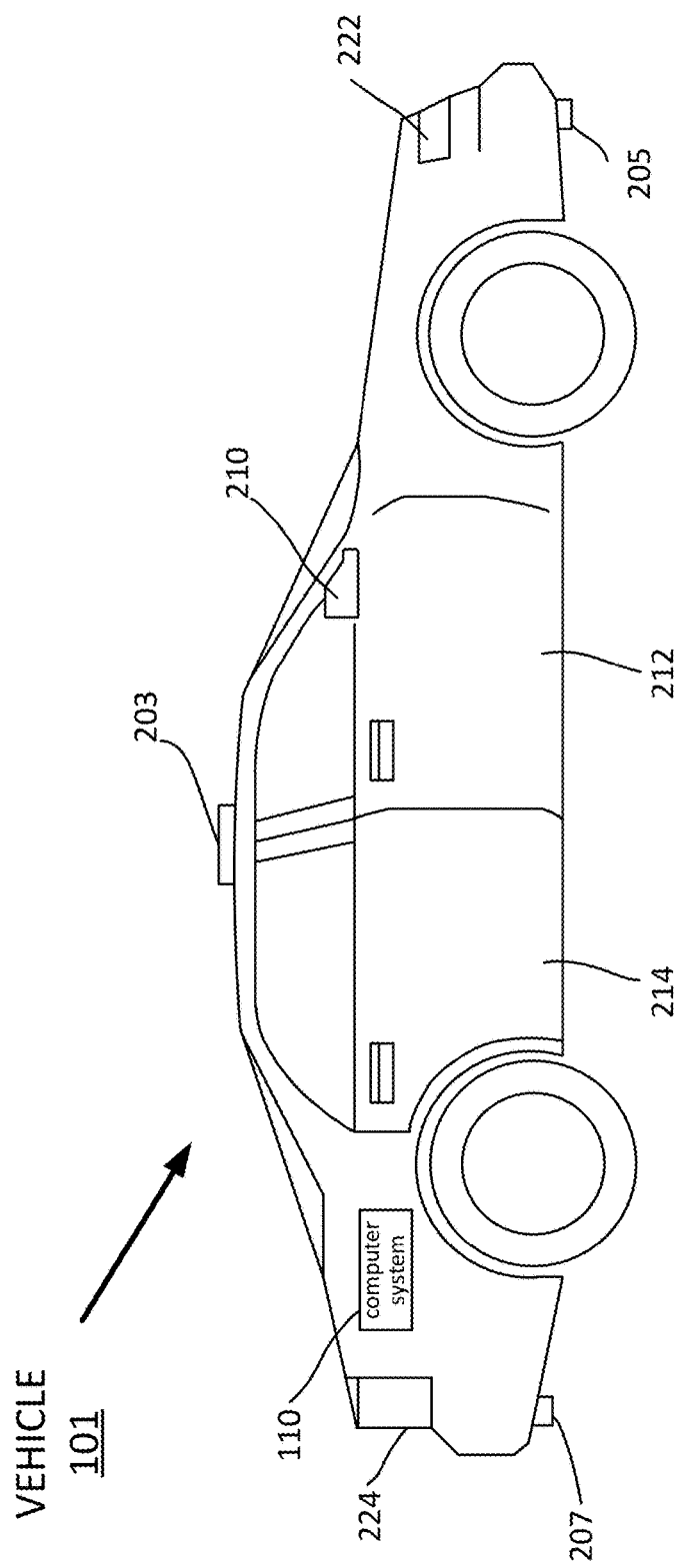
FIG. 2A is an example of the side exterior view of vehicle, in accordance with the elements of this disclosure.
Figure 2B:
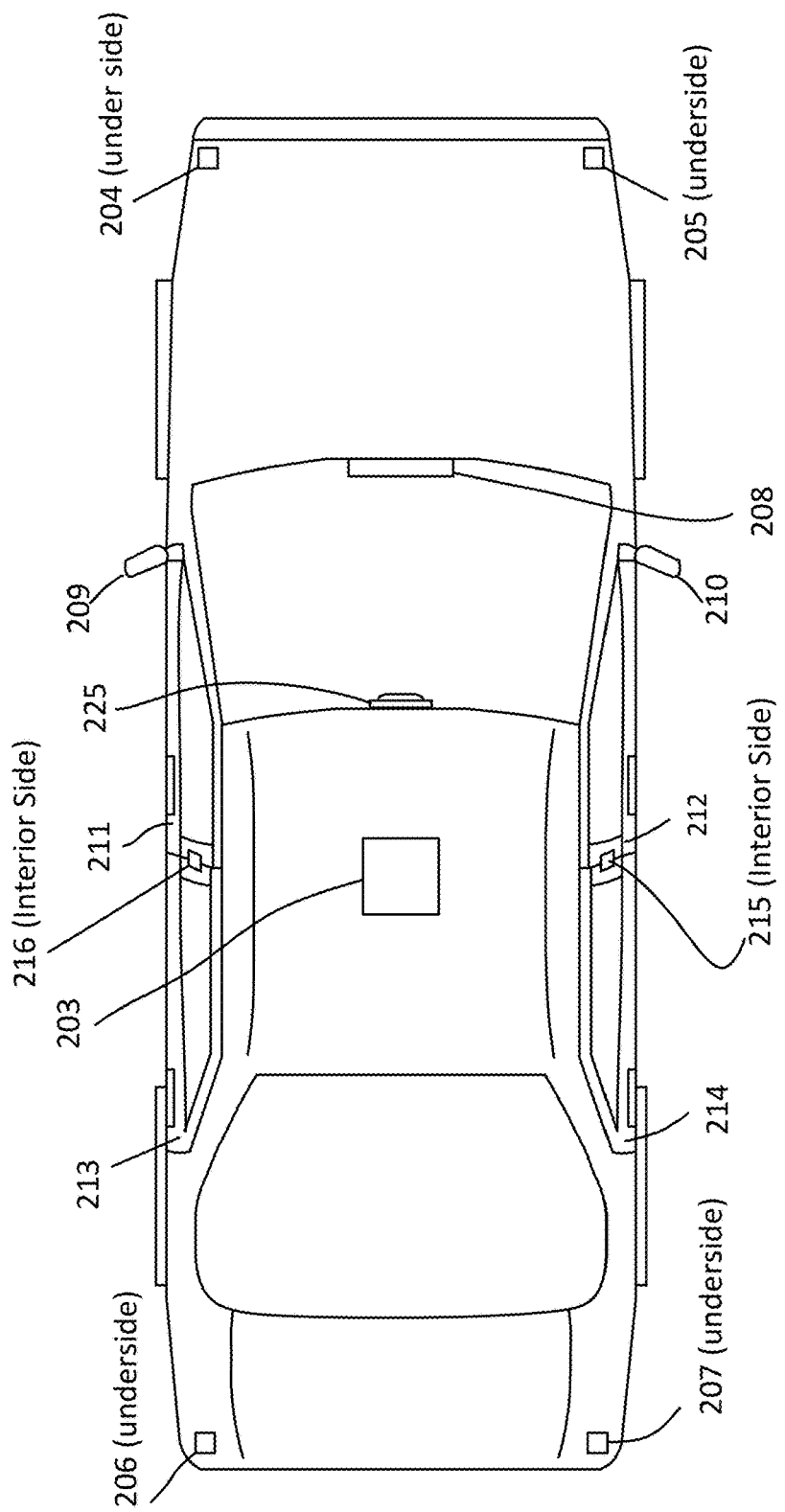
FIG. 2B is an example of the top exterior view of a vehicle, in accordance with the elements of this disclosure.
Figure 2D:
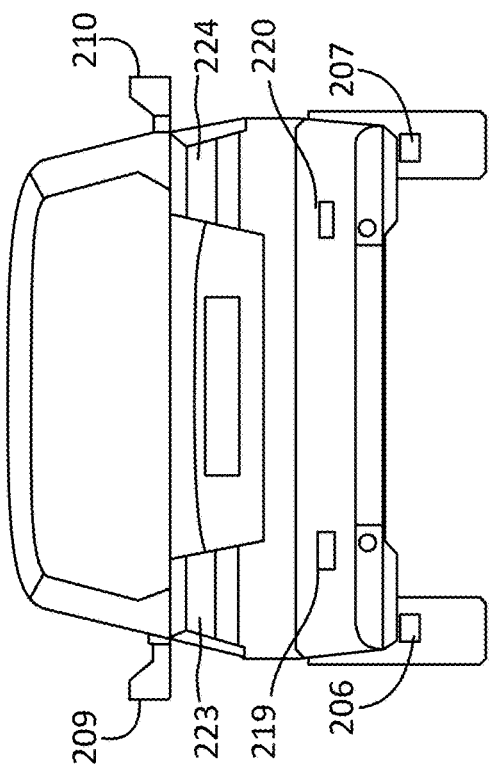
FIG. 2D shows an example of the rear view of a vehicle, in accordance with the elements of this disclosure.
Figure 2C:
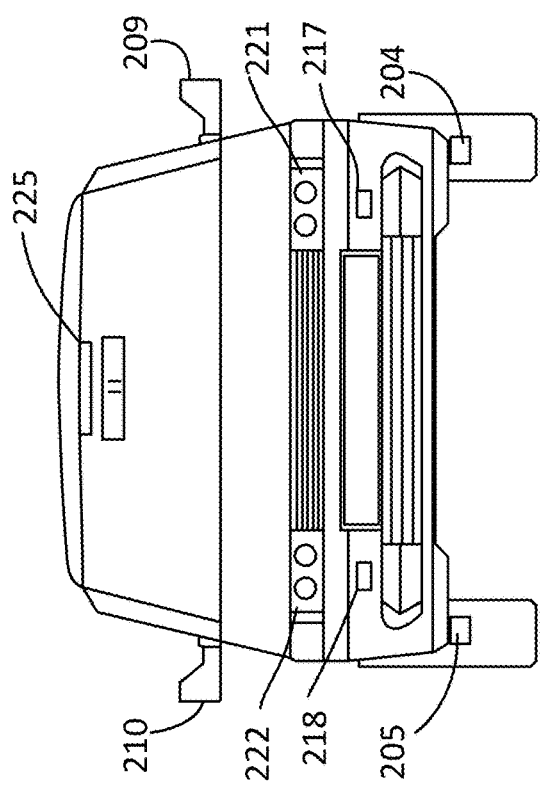
FIG. 2C shows an example of the front view of a vehicle, in accordance with the elements of this disclosure.

For example, FIG. 2A shows a right-side exterior view of source vehicle 101 in an example embodiment of the invention. The source vehicle 101 can be any type of vehicle including autonomous, semi-autonomous, or conventional vehicles, such as but not limited to: cars, trucks, buses, motorcycles, personal transportation vehicles or devices, such as: one, two, or three wheel personal transporters, or any other vehicle or machine that may be mobilized. In one aspect of the disclosure, the autonomous, semi-autonomous, or conventional vehicle 101 may include a computer system 110, which may include one or more computers, as further described in FIG. 12 below. For example, in FIG. 1, computers 110 may include a processor 111, memory 112, and other components typically present in commercial or general-purpose computers. It should be noted that the computer could be located anywhere in the vehicle 101 and could be distributed into any of various places, not necessarily centrally located nor in the place shown in the figures, which represents an example only. Off-loaded computer functionality may also be used. In such examples, data communications may be used to off-load processing of data and/or storage of data that could be accessed by the computer 110. In such examples, the computing power of the vehicle may be increased using back-end systems that are off-board.

In some examples, the computer system 110 may receive data about the current state of the source vehicle 101 and about the current state of the environment of the source vehicle 101 from various sensors and/or through communication with other systems that may be components of or exterior to the source vehicle 101. Inward-focused sensors may include speedometer, accelerometer data, collision detection data, or other sensors. Outwardly-focused sensors may include proximity sensors and location sensors as described here.

The computer system 110 may then use data from the sensors, along with other data 114 stored in memory 112, to determine and execute any various software programs. Such software programs may instruct signaling systems, such as 1) whether or not to produce an illuminated signal or any other type of signal, 2) may inform the signaling system of the properties of that signal, such as but not limited to: the dimensions, color, image, size, blink, or shape, 3) the duration of the signal, or 4) whether or not to disable a signal if another is currently active. The variable aspects of these signals may be manually selected, previously programmed, updated by communication with a back end system, or any combination. The computer system 110 may also implement, be integrated into, or work in communication with an autonomous driving system or semi-autonomous driving system that may fully or partially control the function of the vehicle 101.

The processor 111 may be any conventional processor, such as but not limited to, commercially available processors. Alternatively, the processor 111 may be or include an embedded system with a dedicated function, an application-specific integrated circuit (ASIC), or a microprocessor. The processor 111 may comprise multiple processors that may or may not be working in parallel, communicating with one another, or each working on separate functions. In the case of multiple processors, all or any number of the processors may be located externally or remotely from the vehicle 101 itself, so that some processes may be executed on processors located locally within the vehicle and others may be executed remotely in wireless communication with the vehicle. Furthermore, some or any number of the processors may be dedicated to executing particular functions of the entire system.

The memory 112 may be configured to store information including instructions 113 and data 114 that may be used by the processor 111. The memory 112 may be any number and combination of non-transitory computer readable mediums that can store information that may be accessed and read by the processor 111 or the vehicle central processor 123 either directly or with the aid of another electrical device. Memory 112 types include but are not limited to: hard-drives; read only memory (ROM) such as, but not limited to programmable read-only memory (PROM), erasable programmable read-only memory (EPROM), and electrically erasable programmable read-only memory (EEPROM); random access memory (RAM) such as, but not limited to static random access memory (SRAM) and dynamic random access memory (DRAM); digital versatile discs (DVD); and optical disks. In the case of multiple storage media, different sections of the memory contents may be distributed across the different mediums. Content may be stored redundantly on various mediums as well.

The instructions 113 may be any set of instructions to be executed by the processor 111. The instructions 113 may include machine code, scripts, or other instructions that may be executed directly or indirectly by the processor 111. The instructions 113 may be stored in any form or computer language that may be interpreted directly or previously compiled. The instructions 113 may include various algorithms, such as, but not limited to: lane detection algorithms to detect the presence and location of lanes; object detection and recognition algorithms to detect the presence of various objects and determine the identity of various objects in the surrounding environment of the vehicle 101, such as, but not limited to vehicles, people, animals, trees, signs, and buildings; object path prediction algorithms to predict the movement of various objects in the surrounding environment of the vehicle 101 such as other vehicles and other road users; and signaling algorithms to manage the behavior of the signaling devices, such as when to produce an illumination or other type of signal, which module, modules, device, or devices to select for activation, the exact properties of the signal or signals to be produced, and when to deactivate the signal or signals if any are currently active.

The memory 112 also stores data 114 that may be read, stored, modified, or otherwise accessed by the processor 111 in its execution of the instructions 113 or by other electronic devices during operation of the source vehicle 101. Data 114 may include information such as: detailed maps, projection images, and sound files. The data 114 may be organized in any data structure in a format that can be read by a computer 110. Data 114 may also include data about the state of the source vehicle 101 and/or its environment during previous operation of the source vehicle 101 that may be used to affect the behavior of the source vehicle 101 in the future.

Although FIG. 1 illustrates a single processor, memory, and other components within a single computer, the computer 110, processor 111, and memory 112, may also comprise multiple computers, processors, and memories that may or may not be located within the same place or location, in part or in its entirety, that may or may not be operating in parallel, and that may or may not be in communication with one another. Some or any of the components may also be located externally to the vehicle 101 and interact with the vehicle 101 through wired or wireless communication system. The computer system 110 may receive or transfer data 114 to and from computers and/or servers through any device capable of transmitting data such as modems and wireless network interface controllers. FIG. 12 describes other computer features as well.

The computer system 110 may also include other components not explicitly mentioned above but which are normally found in widely available computers, including any number of electronic displays 115, such as light emitting diode (LED) displays, liquid crystal displays (LCD), or transparent displays, that may display information and may have touch screen and voice input functionality, and user input 116 devices or interfaces such as, but not limited to, switches, buttons, gesture recognition devices, voice recognition, and in-vehicle infotainment systems.

The computer system 110 may also be able to communicate with other components and systems of the vehicle 101, such as, but not limited to, the braking system 117, acceleration system 118, steering system 119, global positioning system 120, accelerometer, gyroscope, object detecting components 121, audible components, Vehicle-to-Vehicle communications 124, and signaling components 122 that may include illuminating devices and/or modules such as light amplification by stimulated emission of radiations (LASER), and illuminating devices and/or modules that are compatible with Light Fidelity (Li-Fi). The computer system 110 may also use data from sensors that are typical to conventional vehicles such as: the engine coolant temperature sensors, tire-pressure monitoring sensors, and door ajar sensor. Through such communication, the computer system 110 may receive data about the current state of the source vehicle 101 and the current state of the environment of the source vehicle 101 that may be used by the processor 111 in executing instructions 113 and may also be stored in data 114 so that it may be referenced or used. The aforementioned components and systems may be either internal or external to the source vehicle 101.

In some embodiments, the source vehicle 101 may also include object detecting components 121 for detecting the state of the environment external to the source vehicle 101 itself, including but not limited to objects such as other vehicles, pedestrians, obstacles in the road, traffic signals, road signs, trees, etc.

In some embodiments, the object detecting components 121 can include but are not limited to lasers, radars, cameras, ultrasonic sensors, and any other type of sensors that can sense the current state of the environment of the source vehicle 101.

FIGS. 2A, 2B, 2C and 2D show various aspects of the source vehicle. These figures show example embodiments with two side view mirrors on the left 209 and right 210 as well as four doors for the driver 211, front-seat passenger 212, left back-seat passenger 213, and right back-seat passenger 214. The source vehicle 101 may have less or more than four doors and the doors on the vehicle can include but are not limited to conventional car doors, sliding doors, suicide doors, butterfly doors, gullwing doors, falcon doors, etc. Furthermore, the respective numberings, order, or placement of the door of the driver, front-seat passenger, and back-seat passenger(s) may change depending on the location of the source vehicle 101, such as: the city, state, country, of the source vehicle 101.

In some embodiments, the source vehicle 101 may have one or more sensors, which may provide information to the source vehicle 101 computer 110, such as: the distance of an object from the current environment to the source vehicle 101. These sensors may be placed and/or integrated into any part of the vehicle including but not limited to, on the top 203 of the source vehicle 101, left 217 and right 218 of the front bumper, the left 219 and right 220 of the rear bumper, windows, hood, trunk lid, panels, doors, wheels, wheel hubs, or pillars.

In some non-limiting examples, the sensors are or include lasers. In some non-limiting examples, the lasers may be sense environments up to 1000 meters from the source vehicle 101 to a relative object in the current environment. The range of the laser(s) may vary according to the type of laser(s) used. The lasers can be any shape, type, size or numerical amount, and be placed in any desirable location of the source vehicle 101.

Additionally or alternatively, in some embodiments, the source vehicle 101 sensors are one or more radars such as those used for collision avoidance systems or adaptive cruise control. These systems use sending and receiving radio waves to determine the range, angle, or velocity of objects in order to gather information about the environment of the source vehicle 101. These radars may be placed anywhere on the vehicle including but not limited to, on the top 203 of the source vehicle 101, left 217 and right 218 of the front bumper, the left 219 and right 220 of the rear bumper, but are not limited to these placements. In some examples, the radars may include a range up to 200 meters. The range of the radar(s) may vary according to the type of radar used. The radars can be any shape, type, size, or numerical amount, and be placed in any desirable location of the source vehicle 101.

Additionally or alternatively, in some embodiments, the source vehicle 101 sensors may include one or more cameras, which can provide information regarding objects in the environment of the source vehicle 101 such as: distance, dimensions, contours, etc. The cameras may also be used to capture images of objects, which the computer system 110 may analyze by using an image recognition algorithm to recognize what the object is by comparing it to known images. These cameras may be placed anywhere, including but not limited to, on the top 203 of the vehicle 101 and/or the interior of the windshield 225 near the rearview mirror, but are not limited to these placements. The cameras can be any shape, type, size, or numerical amount, and be placed in any desirable location of the source vehicle 101.

Additionally or alternatively, in some embodiments, the source vehicle 101 sensors may include one or more ultrasonic sensors, such as those used in back-up collision intervention technology, which can provide information regarding the distance from the source vehicle 101 to a relative object in the current environment of the source vehicle 101. These ultrasonic sensors may be placed on the left 217 and right 218 of the front bumper, the left 219 and right 220 of the rear bumper, and/or the side of the car, but are not limited to these placements. In some examples, the ultrasonic sensors may be used to sense environmentals up to a range of 1-10 meters from the source vehicle 101. The example ultrasonic sensors can be any shape, type, size or numerical amount, and be placed in any desirable location of the source vehicle 101 as described above.

Additionally or alternatively, in some embodiments, the source vehicle 101 sensors may include one or more global positioning systems (GPS) 120, antenna and receivers. Such GPS systems may provide the vehicle 101 location using the GPS receiver placed in/on the source vehicle 101 connected to the relative GPS satellites. The global positioning system 120 receivers may be placed anywhere on the source vehicle such as but not limited to on the top 203 of the source vehicle 101, hood or trunk lid, windows or windscreen. The global positioning system 120 can be any shape, type, size, or numerical amount, and be placed in any desirable location of the source vehicle 101.

In some embodiments, the source vehicle 101 may have one or more vehicle to vehicle communications systems 124, which may use receivers and transmitters to communicate information to other vehicles, such as: its own vehicle location, speed, direction, etc., and/or information about sensed environmentals such as location, speed, direction of other sensed vehicles. Such a vehicle-to-vehicle communication system 124 may include antennae that could be located anywhere on the vehicle, such as the top 203 of the vehicle, hood or trunk lid, windows or windscreen but is not limited to these placements. Such a vehicle-to-vehicle communication system 124 can be any shape, type, size or numerical amount, and be placed in any desirable location of the source vehicle 101.

In some embodiments, the source vehicle 101 may include one or more types of object detecting components 121, in any combination or configuration, described above in any desirable locations of the source vehicle 101 to collect data about the current environment of the source vehicle 101.

EXTERNAL SIGNAL PROJECTIONS

In certain embodiments, the onboard computer system 110 may receive and analyze any of various sensor information as described above in order to determine which commands to send to signaling devices 204, 205, 206, 207 as described here. As described, the information that the computer system 110 may consider may include sensed environmentals around the source vehicle 101 and/or status of the vehicle. Sensed environmentals may be any object or condition around the vehicle as described herein. Status of a vehicle may include alone or any combination of vehicle speed, location, gear, etc. Such commanded signals may include any number of things including but not limited to a projected sign, projected visual sign, projected hologram, auditory alert and/or vibrations.

Figure 3:
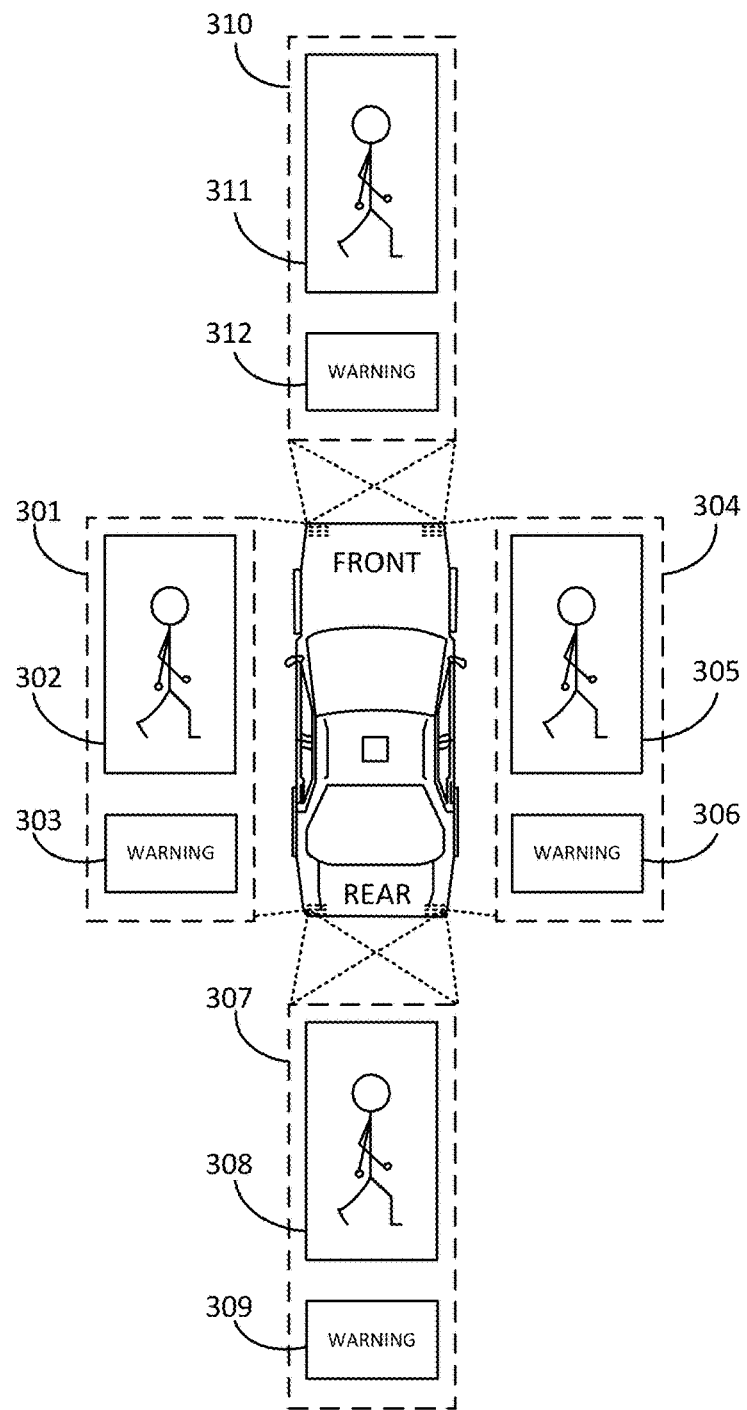
FIG. 3 is an example vehicle with projections from illumination devices or modules on all four sides, in accordance with the elements of this disclosure.

Referring now to FIG. 3, In some embodiments, the source vehicle 101 may include one or more signaling devices or modules 122 that may provide information to the 1) drivers, passengers, or computer systems in other vehicles. 2) road users including but not limited to pedestrians, motorcyclists, bicyclists, etc., and 3) any other object in the current environment of the source vehicle 101. In addition to the current signaling technology in typical and conventional vehicles including: turning signals, brake lights, reverse brake lights, audible signals such as the horn, and in some cases, headlights, the systems and methods described here utilize various combinations of advanced signaling technology that may include illuminating devices or modules and/or sound devices or modules. In some embodiments, the illuminating devices or modules may project an image that is the same dimensions as the source vehicle on the left-side 301, right-side 304, front-side 310, and rear-side 307. In such examples, the driver of the source vehicle or other vehicles can understand where the vehicle is about to move.

The placement of the illuminated signs 301, 304, 307, 310 is not limited to the placements in FIG. 3, but may be projected in any location with reasonable proximity to the source vehicle 101. The illumination devices or modules may be placed inside of the left-side 221 and right-side 222 headlights, and/or the left-side 223 and right-side 224 tail lights. The headlights 221, 222 and/or taillights 223, 224 may or may not already contain illuminating functionality discussed herein. The illumination devices or modules may also be placed near the left-side 204 and right-side 205 of the front bumper, and the left-side 206 and right-side 207 of the rear bumper. However, the illumination devices or modules can be placed in any desirable location, such as the top of the car, any four sides of the vehicle, the bottom-side of the vehicle, etc. There can be less or more than four total illumination devices or modules configured on the vehicle.

VISUAL EXAMPLES

Still referring to FIG. 3 and FIGS. 2A, 2B, 2C and 2D, the source vehicle 101 in some embodiments, can use one or more illumination devices or modules to project the dimensions of the source vehicle 101, animations/pictures, and/or words, for example, the dimensions 301 on the left side of the source vehicle 101 can be projected by using both illumination devices 204, 206, depending on the environment of the vehicle. If an obstacle is blocking the front-left illumination device or module 204, only the back-left illumination device or module 206 may be used. If the source vehicle 101 is in a situation where the weather conditions that may affect the visibility of the projections, both illumination systems 204, 206 may be used.

The illumination devices in some embodiments, can be mounted on a motorized or stationary mount, however, a motorized mount may be preferred in order to avoid any obstacles, such as a hindrance the device may encounter if it is stationary. The motorized mount may be able to rotate 270 degrees vertically and 360 degrees horizontally.

The illumination devices or modules in some embodiments, may include projectors such as but not limited to: cathode ray tube (CRT) projectors, digital light processing (DLP) projectors, light amplification by stimulated emission of radiation (LASER) projectors, liquid crystal display (LCD) projectors, liquid crystal on silicon (LCOS) projectors, light emitting diode (LED) projectors, and any other components that can project an image or video on a surface such as but not limited to: a road, freeway, highway, pavement, non-paved roads, etc. The illumination devices or modules may be used individually or coupled with Li-Fi technology, if the respective projector(s) are compatible with Li-Fi technology. Li-Fi is a light technology that may use light as a medium to deliver data or information between the computer systems 110 of autonomous, semi-autonomous, or conventional vehicles.

In some embodiments, these projected visual signals may include many various aspects, such as: a fill color or pattern (e.g., checker, diamond, diagonal crossing, etc.) to distinguish the projected dimensions from the surface it is projected on. These projected dimensions, 301, 304, 307, 310, can be the exact dimensions of the source vehicle 101 or may be any shape, size, color, or intensity depending on the environment of the source vehicle 101 such as: the weather or obstacles, as well as the shape, size and type of the source vehicle 101. The illumination devices or modules may project its dimensions, with or without animations/pictures and/or words on 1) all four sides, 301, 304, 307, 310, simultaneously 2) any combination of three projections, such as: the dimensions 301, 304, 307, 3) any combination of two projections, such as: dimensions 304,307 or 4) any projection of the dimensions, 301, 304, 307, 310 independently.

Some examples may also include animations/pictures used in some embodiments, such as but is not limited to: bar codes, QR codes, video or signal of a pedestrian crossing a road, a stop sign, straight line(s), curved line(s), etc., included in the projection, that can be understood by drivers and/or computer systems in autonomous, semi-autonomous, or conventional vehicles. In the example embodiment of FIG. 3, the animations/pictures 302, 305, 308, 311 such as but not limited to: a pedestrian walking, turning arrows, etc. can be placed inside of the projected dimensions, 301, 304, 307, 310 respectively, however, the animations/pictures can be placed anywhere ranging from inside, outside, or near the projected dimensions 301, 304, 307, 310. The animations/pictures may vary in shape, type, color, or size, depending on the source vehicle 101 and/or the environment of the source vehicle 101. The projected dimensions 301, 304, 307, 310 may also include words 303, 306, 309, 312 such as: "Warning," "Alert," "Emergency," etc. The words 303, 306, 309, 312, can be placed inside, outside, or near the projected dimensions 301, 304, 307, 310. Furthermore, the font type, style, language, and size may differ according to the shape, type, and size of the source vehicle 101, location and/or the physical environment surrounding the source vehicle 101. Furthermore, the source vehicle 101 may project 1) all three elements of the signal including the dimensions, animations/pictures, and words, 2) any combination of two of the elements, or 3) any one element, independently.

In some examples, projections 301, 304, 307, 310 could be sized according to a particular safety dimension. For example, when a door is about to open, a side projection 301, 304 could be the same dimension as the door opening or where it could potentially swing. In some examples, an extra buffer could be added to the actual dimensions to allow for extra safety. In such examples, when a door is opened, a projection illuminates the road surface showing where the door could potentially open if opened all the way. In some examples, an added buffer of one foot is illuminated around the potential dimensions, and in some examples, the extra buffer is a different color.

In some examples, a front projection 310 may be projected when a driver or autonomous vehicle begins braking. Such a projection may indicate an approximation of where the vehicle may end up if the brakes are applied to a full stop. In such an example, a braking projection could change based on speed, sensed driving conditions or by how much the brake is being applied. For example, in a dry condition, at 30 mph, the braking projection could be illuminated so the driver or surrounding vehicles or people could see an indication of where the source vehicle will ultimately end up if it comes to a full stop. In wet weather or faster speeds, the braking illumination would be longer, indicating a longer braking distance to full stop. As the source vehicle slows, the projection could be updated and shortened as the projector travels forward, thus illuminating the same area on the driving surface, during the braking action. The braking projection would then get shorter and shorter until, ultimately, at full stop, the braking projection would no longer be illuminated. In such a way, the projection would inform surrounding people and/or vehicles of where the source vehicle may end up in a full brake. Such a projection could also help the driver of the source vehicle or autonomous computer, to see if a rear end collision is going to happen, and if so, potentially to change course or direction to avoid such a collision. In such examples, a driver may hit the brakes on the freeway if the traffic in front of her slows down, and seeing that her braking illumination path takes her through the bumper of the car in front, veers to the shoulder and avoids a rear end collision.

In some examples, a rear projection 307 could be used in a similar fashion, showing total estimated braking distance for the speed and driving conditions. In some examples, the braking projections 310, 307 could be projected to indicate position even during a turn. For example, as the driver or autonomous computer turns the wheel and therefore tires, the braking projection may likewise show a curve so the driver or others may visualize where the source vehicle is likely to end up during the braking operation.

In some example embodiments, vehicles may include camera sensors that may not only sense environmentals such as pedestrians, cars, road features or other obstacles, but may also be programmed to detect and interpret the visual signals projected by other vehicles. By sensing not only physical environmentals but also other projected warnings, the vehicle may enhance its own understanding of nearby environmentals, even if they are not sensed by the vehicle itself. This information may inform an autonomous computer and allow driving decisions be made to avoid collisions.

In such examples, the camera may sense a projection of a vehicle changing lanes and slow down to allow the lane changing vehicle to safely move. In another example, the camera may sense the projection from another vehicle of a pedestrian which itself is outside of its own sensor range, and still stop to avoid a collision. Examples where vehicles display specialized patterns or QR codes, more complex information may be passed between or among vehicles, such as upcoming maneuvers for autonomous vehicles, sensor diagnostic information, weather information, road condition information, payload information, or other useful information may be passed.

AUDIBLE SIGNALS

The signaling system in some embodiments, in the source vehicle 101 may also include a sound device or module that may alert road users such as: pedestrians, motorcyclist, bicyclists, or any other road users. The sound device(s) or module(s) may be placed near the left-side 204 and right-side 205 of the front bumper, and the left-side 206 and right-side 207 of the rear bumper. However, the sound devices or modules can be placed in any desirable location, such as the top 203 of the car, any four sides of the vehicle, and the bottom-side of the vehicle, etc. There can be less or more than four total sound devices or modules configured on the vehicle. The sound devices or modules may include features such as: chimes, alert sounds, and/or an automated voice. For example, in order to alert a pedestrian of a potentially hazardous situation, the computer system 110 may command the sound device or module to alert the pedestrian "Wait," "Do Not Cross," "Car Approaching, Do Not Cross," etc.

INDICATOR EXAMPLES

Referring again to FIG. 2B, the signaling system in some embodiments may also include an internal indicator 208, 215, 216 that may signal information to the driver/passenger driving, riding, or intending to get on/off an autonomous, semi-autonomous, or conventional vehicle. The internal indicator 208, 215, 216 can include but is not limited to: illuminated devices or modules such as: signs using light emitting diodes (LED) inside of the source vehicle 101; sound devices or modules such as speakers; vibrations from the seat or door handle/button; and/or words or pictures displayed on a screen 115, if the vehicle possess a display screen. These internal indications may be placed on the dashboard 208, the left B pillar 216, the right B pillar 215, but can be placed in any desirable location that can be easily viewable, hearable, and/or haptic by the driver/passenger, such as the back of the driver and passenger seat headrest. These internal indicators 208, 215, 216 can be used in any type, configuration, or number.

MORE EXAMPLES

The FIGS. 4-8 and 10 show exemplary situations of the source vehicle 101 in a straight road lane that is parallel to other lanes. However, this signaling is not limited to straight parallel roads and may be used in/on any type of road configuration, road design, or traffic conditions, using all or some of the features in the exemplary figures. For example, although some figures may portray exemplary situations of vehicles that are moving in the same direction, this invention may be used by vehicles that are moving in opposite directions as well.

Figure 9A:
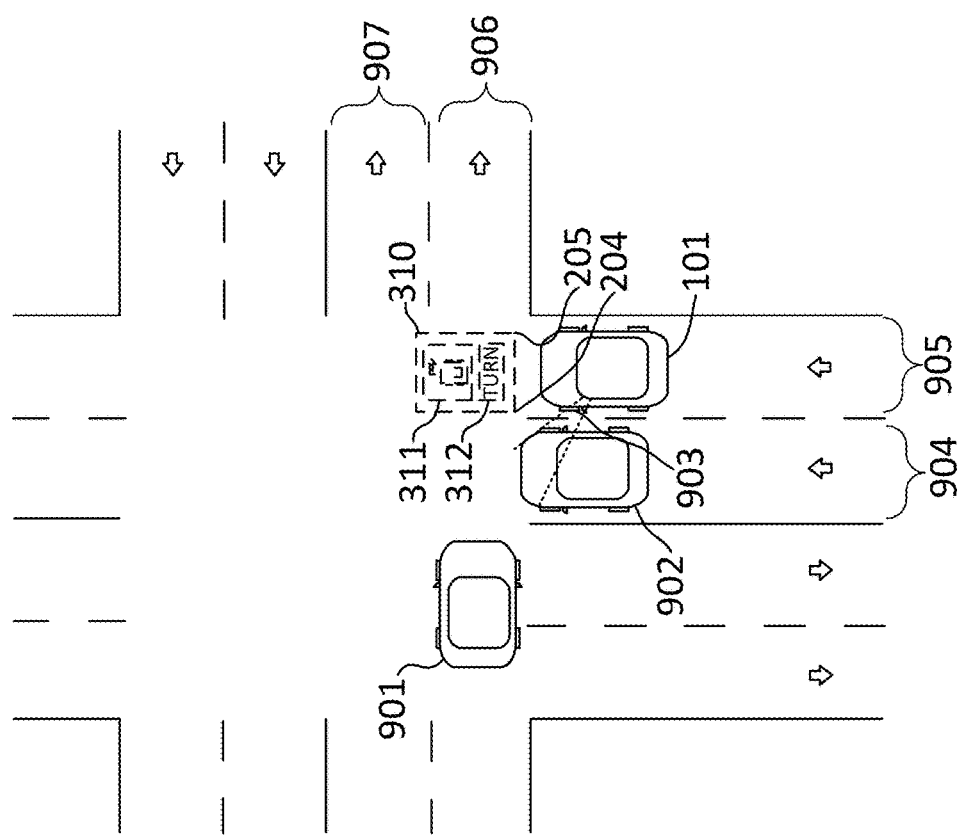
FIGS. 9A and 9B are an example of a signaling device in an operating scenario, when a vehicle is turning at a four-way intersection, according to the elements of this disclosure.
Figure 9B:
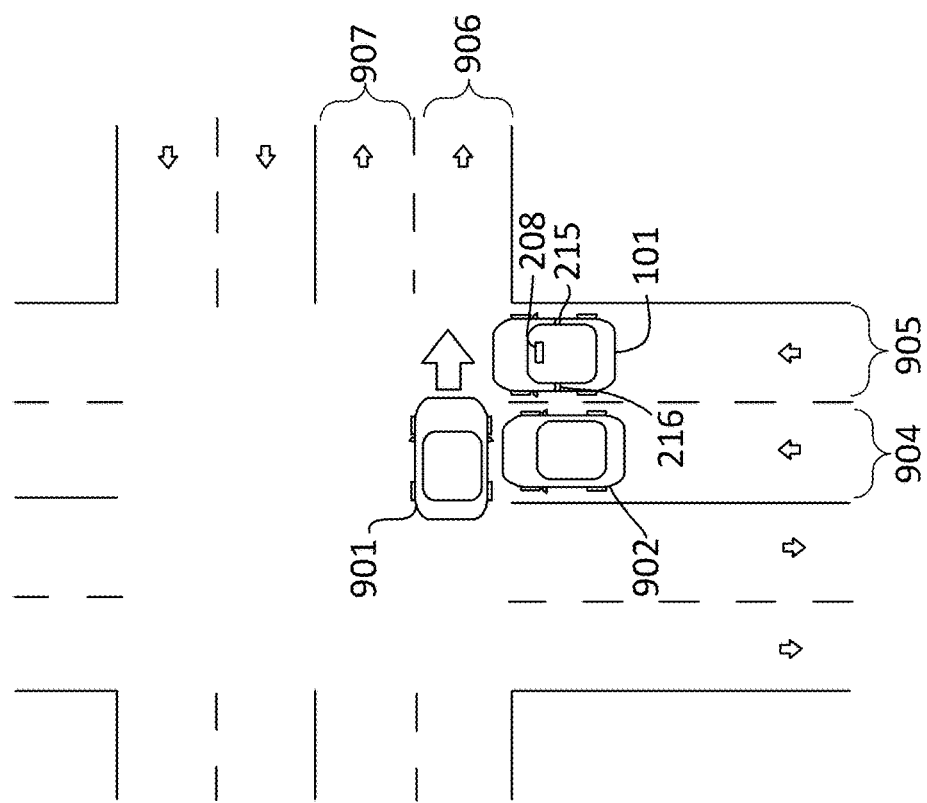
Figure 11:
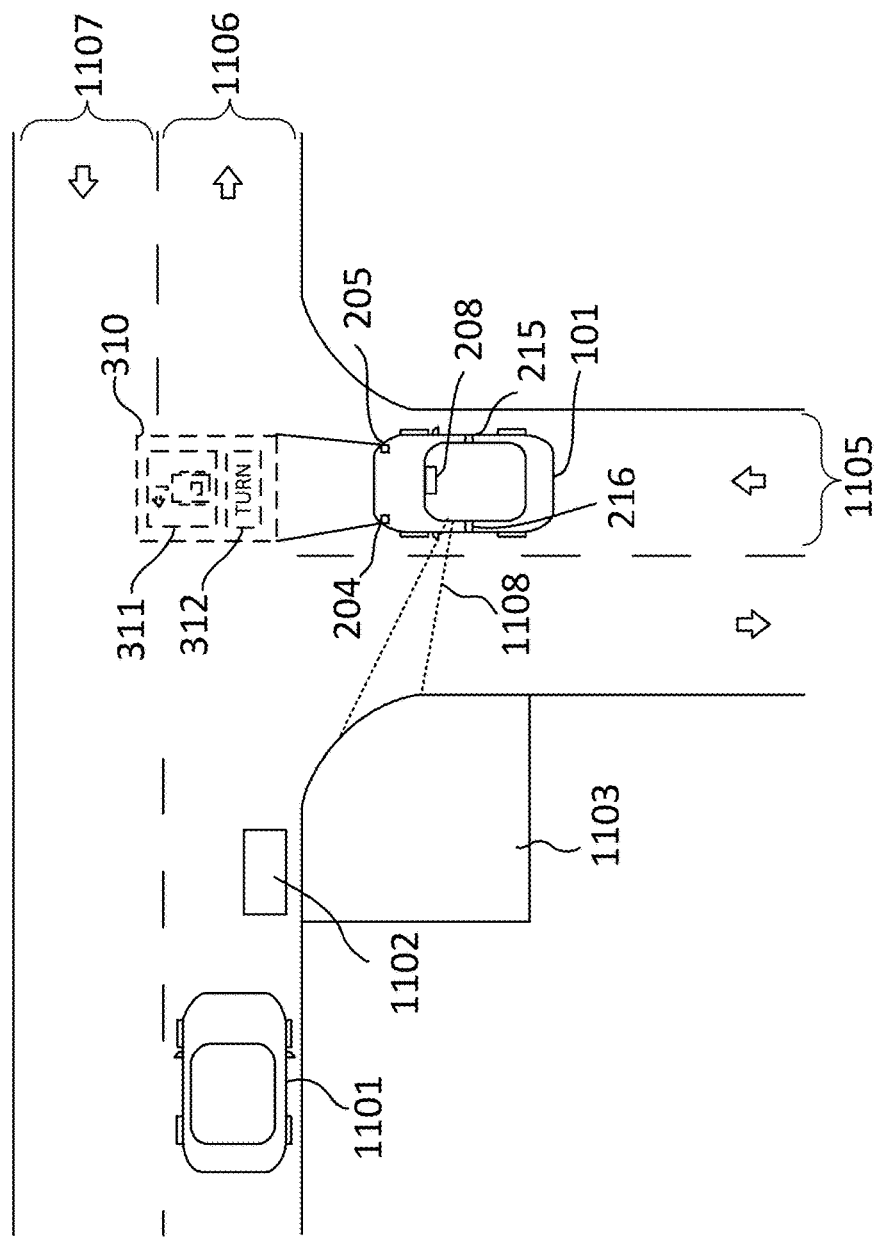
FIG. 11 shows an example of a signaling device in an operating scenario, when a vehicle is turning at a T-intersection, according to the elements of this disclosure.

Similarly, although FIGS. 9A, 9B and 11 show exemplary situations of a source vehicle 101 in a four-way intersection and T-intersection, this signaling is not limited to intersections and may be used in/on any type of road configuration, road design, or traffic conditions, using all or some of the features in the exemplary figures.

Furthermore, the figures enclosed in this disclosure are merely exemplary. The signaling systems can be used in any suitable or desirable situation for any type of vehicle, machine, or device that may be mobilized.

Figure 4A:
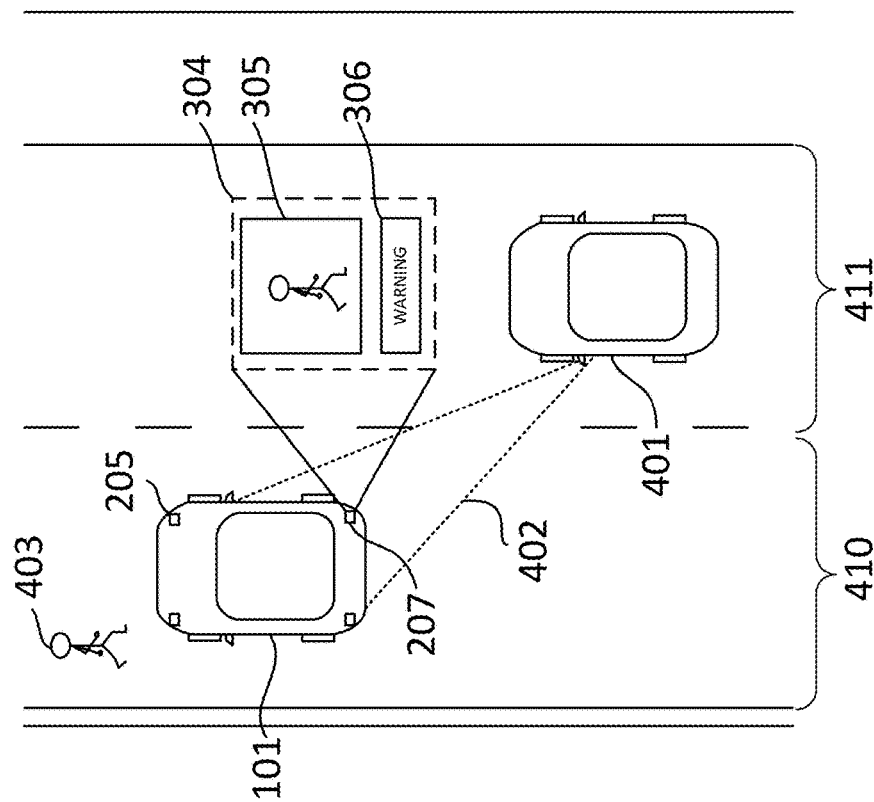

In FIGS. 4A and 4B, an example of a warning system is described. If an object 403 such as a pedestrian, bicyclist, motorcyclist, or scooterist, is crossing a road where vehicles pass through from the left side, by a crosswalk or by jaywalking, in any time of day or any weather conditions, the driver or computer system 110 of the source vehicle 101 in the left lane 410, may witness or sense the object's intent to cross the road in some embodiments, through visual cues or data received from the sensors, server, and/or Vehicle-to-Vehicle Communications 124, and may stop with full knowledge of the object 403 crossing. In certain embodiments, the source vehicle 101 may decrease in speed and come to a stop for the object 403, which is signaled to the target vehicle 401 in the right lane 411 through its brake lights. The target vehicle 401 may include other any other type of vehicle such as a car, truck, bus, motorcycle, etc.; personal transportation vehicles or devices such as Segways, etc.; road users such as bicyclists, pedestrians, etc.; or any other vehicle or machine that may be mobilized. However, the brake lights from source vehicle 101 only signify a current decrease in speed or a stop by the source vehicle 101; the reason for the stop is not clearly relayed to the target vehicle 401. Furthermore, the source vehicle 101 may unintentionally create a blind spot 402 for the approaching target vehicle 401 that may block the view of the object 403, which may deter the target vehicle 401 from stopping for the object 403. The possible blind spot 402 created by the source vehicle 101 may cause an accident for the object 403 and/or for the target vehicle 401.

FIG. 4A shows an example that shows how the computer system 110 may collect data from the sensors, server, and/or Vehicle-to-Vehicle Communications 124 regarding the state of the environment external to the source vehicle 101 itself, including objects such as: other vehicles, pedestrians, road users, obstacles in the road, traffic signals, road signs, trees, etc., to project a signal 304, 305, 306 which can be projected by illumination devices or modules, preferably a projector compatible with Light Fidelity (Li-Fi) technology, to the approaching target vehicle 401 and/or to the object 403.

Such environmentals may be sensed by the various sensors mounted on the vehicle and the onboard computer may analyze the sensor information to generate the projected signs if the sensed environmental meets certain parameters. As a non-limiting example, if the LIDAR senses that a pedestrian is within 15 feet of the vehicle, it may generate a warning signal indicating that a pedestrian is in the road. The sensors may also sense the edges of the road the source vehicle is traveling on to filter out environmentals on the sidewalk or on a raised onramp or overpass.

The computer may analyze the sensor information and take into account other information such as speed of the vehicle or speed of other sensed vehicles when generating signals. For example, if the source vehicle is going 15 miles per hour and a nearby sensed vehicle is going 17 miles an hour, a generated pedestrian warning signal may only be generated when the pedestrian is 20 feet away from the vehicle or vehicles. But if the vehicles are traveling faster, the warning projection may be generated when the pedestrian is farther away, or the warning projection may be different, such as red blinking as opposed to yellow non-blinking if the vehicles are traveling slower.

In the examples, the signal 304, 305, 306 may include the dimensions 304 of the source vehicle 101, animations/pictures 305 such as: a pedestrian walking, road user crossing, etc., or words 306 such as: "Warning," "Alert," "Pedestrian," etc. The projected signs 304, 305, 306 can be placed at any distance from the source vehicle 101, depending on the type, size, configuration of the source vehicle 101, and/or the environment of the source vehicle 101. When the computer system 110 of source vehicle 101 receives data from the sensors, server, and/or Vehicle to Vehicle Communications 124 that there is an object 403 crossing the road, for example, from the left side, and there is a target vehicle 401 approaching, for example, from the right lane 411, the source vehicle 101 can determine and execute a plan of action to project a signal 304, 305, 306 on the right lane 411 for the driver or computer system of the target vehicle 401 to see or scan for information. This example signal 304, 305, 306 may prevent the possible collision between the target vehicle 401 and the object 403, and increase efficiency for the target vehicle 401, which may be semi-autonomous or autonomous. In some embodiments, semi-autonomous or autonomous vehicles may be programmed to stop in most or all circumstances when they sense that the source vehicle 101 in front of them is stopping, and the target vehicle 401 cannot gather enough data regarding the current environment of the target vehicle 401, for example, the current reason for the stop or cannot sense the object 403 due to a blind spot 402 caused by the source vehicle 101 to determine the reason of the stop. This stop from the source vehicle 101 may not always be because of a pedestrian crossing, but because of other instances such as but not limited to: turning left or right onto a different road or picking up a passenger on the side of a road. This signal 304, 305, 306 may increase efficiency, in aspects of time and energy, of the target vehicle 401 by reducing the number of times the target vehicle 401 may stop due to a blind spot 402 created by the source vehicle 101.

This example signal 304, 305, 306 may be projected from either illumination device or module from the front-right side 205, back-right side 207, or from both, depending on the environment of the source vehicle 101. In some embodiments the signal 304, 305, 306 can be projected from the illumination device or module on the rear right 207, however, if there is an obstacle obstructing the illumination device or module 207 such as a motorcyclist, bicyclist, etc., from illuminating its projection, the source vehicle 101 can use the front right illumination device or module 205 instead. If weather conditions such as rain, fog, or sun, make the signal 304, 305, 306 difficult to see, the source vehicle 101 in some embodiments can use both the front-right 205 and back-right 207 illumination devices or modules to project a vivid signal 304, 305, 306.

FIG. 4B shows an example when the signal 304, 305, 306 from the source vehicle 101 is projected, but the computer system 110 receives data about the environment of the source vehicle 101 that the approaching target vehicle 401 is not decreasing in speed or coming to a stop. The computer system 110 in some embodiments may determine and execute a plan of action to turn off the projected signal 304, 305, 306 in the right lane 411 and project a signal 310, 311, 312 or signal, which can include but is not limited to a visible signal or audible sounds, to the crossing object 403 to stop and wait for the approaching target vehicle 401 to pass before continuing to cross. The computer system 110 in some embodiments may also determine and execute to project both signs 304, 305, 306, 310, 311, 312 to the target vehicle 401 and object 403, in a situation with any similarity to FIG. 4A.

PASSING EXAMPLES

Figure 5A:
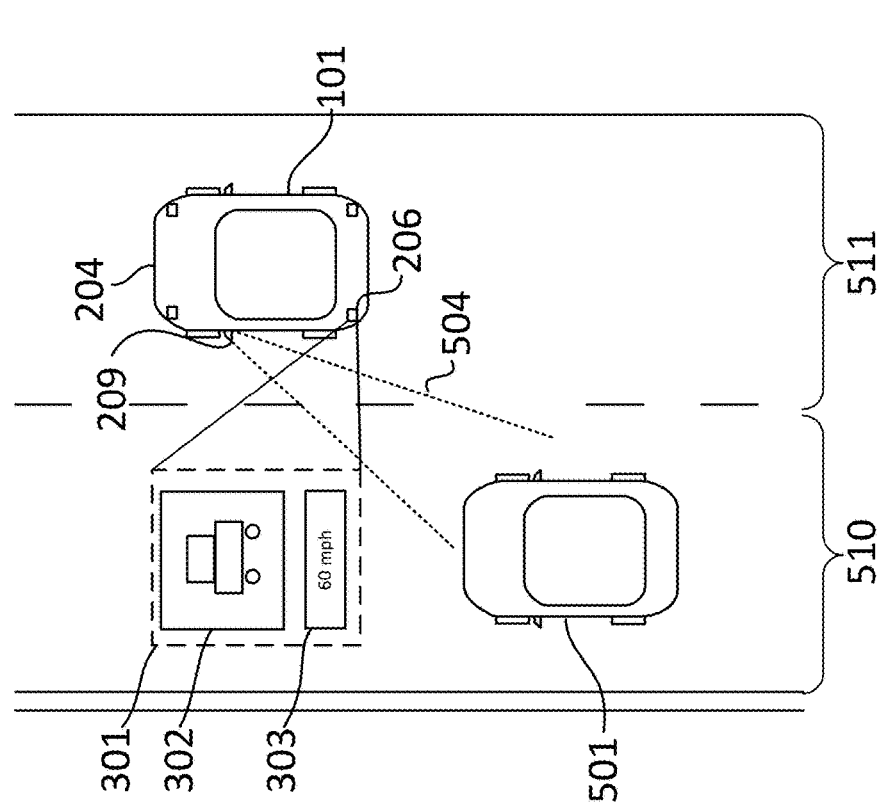
FIGS. 5A and 5B are an example of a signaling device in an operating scenario, when a vehicle intends to change lanes, as described in this disclosure.
Figure 5B:
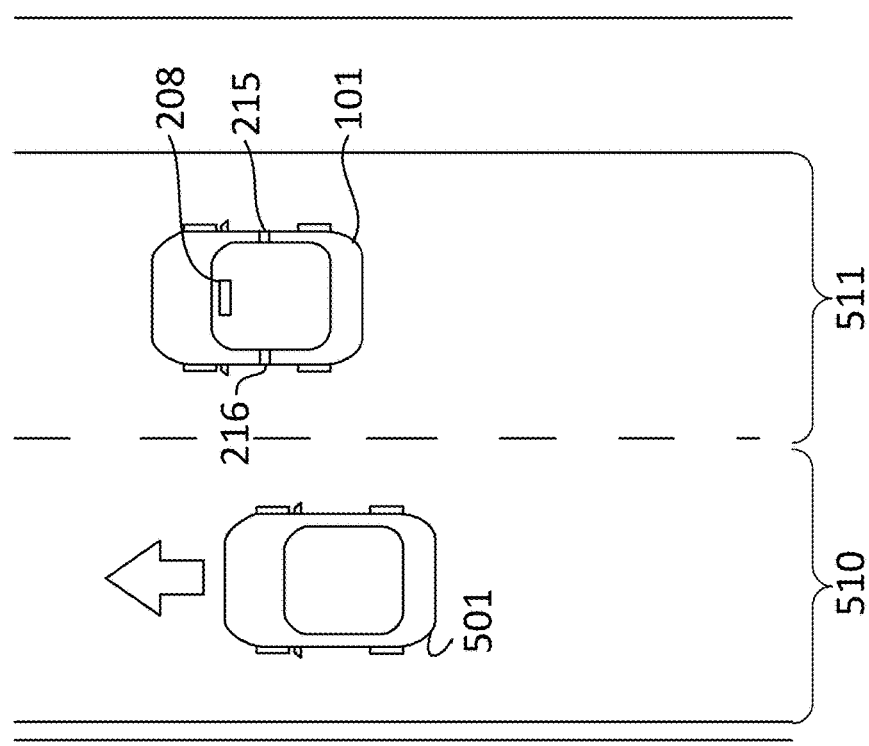

FIGS. 5A and 5B show an example when the source vehicle 101 intends to change lanes on a road such as a highway, freeway or local road.

In FIG. 5A, the source vehicle 101 driving in the right lane 511 shows the intent to change lanes through a turning signal pointing toward the left lane 510. However, the driver of the source vehicle 101 may have a blind spot 504 in the left side view mirror 209. This blind spot 504 may hinder the view of the target vehicle 501 in the left lane 510 to the driver in the source vehicle 101. The target vehicle 501 may include any other type of vehicle such as a car, truck, bus, motorcycle, etc.; personal transportation vehicles or devices such as Segways, etc.; road users such as bicyclists, pedestrians, etc.; or any other vehicle or machine that may be mobilized. The computer system 110 in some embodiments may collect data from the sensors, server, and/or Vehicle to Vehicle Communications 124 regarding the state of the environment external to the source vehicle 101 itself, including objects such as: other vehicles, pedestrians, road users, obstacles in the road, traffic signals, road signs, trees, etc., to project a signal 301, 302, 303 which can be projected by illumination devices or modules, preferably a projector compatible with Light Fidelity (Li-Fi) technology, to the approaching target vehicle 501. If the computer system 110 of the source vehicle 101 receives data from the sensors, server, and/or Vehicle to Vehicle Communications 124 that there is a target vehicle 501, for example, approaching from the left lane 510, the lane 510 which the source vehicle 101 intends to change lanes to, or the target vehicle 501 has similar intentions as the source vehicle 101 to change lanes from the right lane 511 to the left lane 510, the computer system 110 can determine and execute a plan of action to project a signal 301, 302, 303 on the left lane 510 for the driver or computer system of the target vehicle 501 to see or scan for information. The signal 301, 302, 303 in some embodiments may include the dimensions 301 of the source vehicle 101, animations/pictures 302 such as: arrows pointing left or right, etc.; or words/numbers 303 such as: the current speed in miles per hour (mph), kilometers per hour (kph), or any other measure, of the source vehicle 101. The projected signs 301, 302, 303 can be placed at any distance from source vehicle 101, depending on the type, size, configuration of the source vehicle 101, and/or the environment of the source vehicle 101. If the source vehicle 101 is able to complete the lane change, the computer system 110 may turn off the projected signal 301, 302, 303 by fading out the projections as the lane change is made or by decreasing the projections in size as the lane change is made. This signal 301, 302, 303 in some embodiments may be projected from either illumination device or module from the front-left side 204, back-left side 206, or from both, depending on the environment of the source vehicle 101. In some embodiments the signal 301, 302, 303 may be projected from the illumination device or module on the back-left 206, however, if there is an obstacle obstructing the illumination device or module 206 such as a motorcyclist, bicyclist, etc., from illuminating its projection out, the source vehicle 101 can use the front-left illumination device or module 204 instead. If weather conditions such as rain, fog, or sun, make the signal 301, 302, 303 difficult to see, the source vehicle 101 can use both the front-left 204 and back-left 206 illumination devices or modules to project a vivid signal 301, 302, 303. FIG. 5A is an example of the source vehicle 101 changing from the right lane 511 to the left lane 510. This can also apply from a left lane 510 change to a right lane 511, and any other type of lane change such as a situation similar to that of FIG. 6A.

FIG. 5B shows an example embodiment where the signal 301, 302, 303 from the source vehicle 101 is projected, but the computer system 110 receives data about the environment of the source vehicle 101 that the approaching target vehicle 501 is not decreasing in speed. The computer system 110 may determine in some embodiments to turn off the projected signal 301, 302, 303 on the left lane 510 and the driver of source vehicle 101 may be notified through the indicator 208, 215, 216 to wait until the target vehicle 501 has passed before completing the lane change. The indicator 208, 215, 216 in some embodiments may be inside of the vehicle, preferably located in a place that is easily viewable, hearable, and/or haptic by the driver including but not limited to the dashboard, A, B, or C pillar(s), or the display screen 115 if the source vehicle 101 has a display screen. Indicators may be located anywhere on the vehicle and are not limited to the positions shown in the figures. The indicator(s) may be an illuminated sign(s), a visual sign(s), an audible sound(s), and/or a haptic sign(s).

PARKING EXAMPLES

Figure 6A:
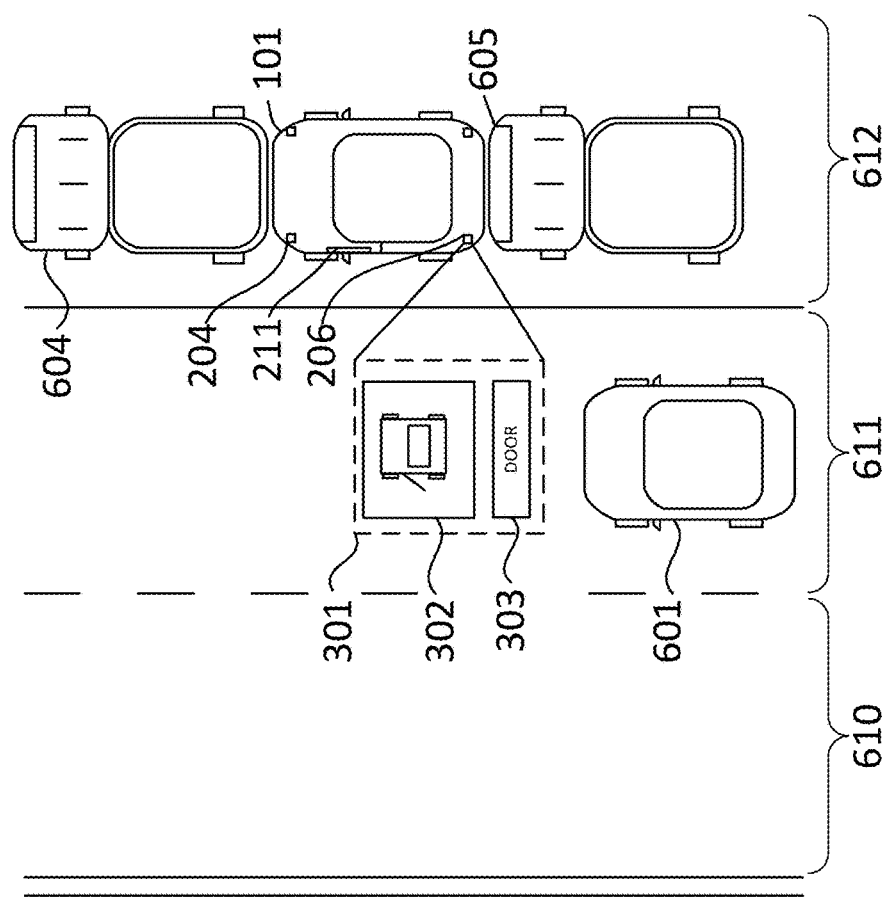
FIGS. 6A and 6B are an example of a signaling device in an operating scenario, when an object such as: a driver or passenger intends to get on/off a vehicle, according to the elements of this disclosure.
Figure 6B:
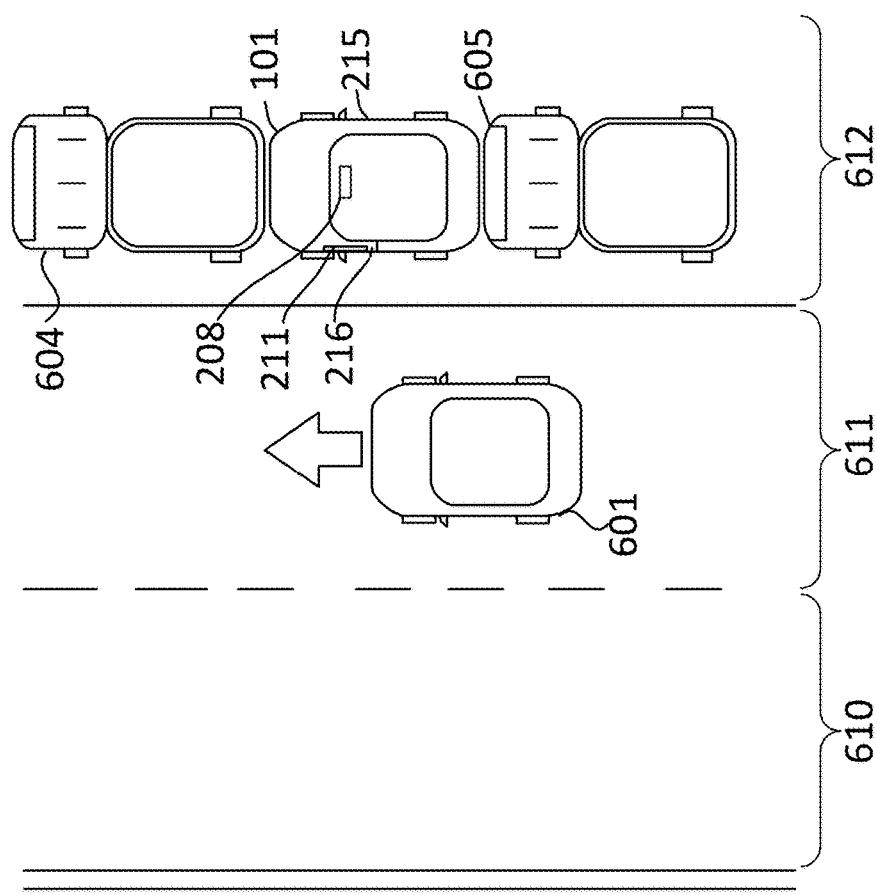

FIGS. 6A and 6B show an example embodiment of a warning system to alert an approaching target vehicle 601 when the source vehicle 101 is in an immobile position, such as parked on street parking or in a passenger drop-off zone, and the driver/passenger intends to get on/off the source vehicle 101 using a car door. The target vehicle 601 may include any other type of vehicle such as a car, truck, bus, motorcycle, etc.; personal transportation vehicles or devices such as Segways, etc.; road users such as bicyclists, pedestrians, etc.; or any other vehicle or machine that may be mobilized. In certain examples, the source vehicle 101 may be in a parked position in the form of street parking on the right side 612 of the road with other parked vehicles, which are both trucks in this example, in front 604 and behind 605 the source vehicle 101. If the driver/passenger of the source vehicle 101 intends to get on/off from the left side of the source vehicle 101, the approaching target vehicle 601 in the next lane 611 may prevent the embark or disembark of the driver/passenger or may collide with the respective car door. If the source vehicle 101 is in a place, such as country where the driver drives on the right side of the source vehicle 101, this example would pertain to the passenger in the passenger seat or the backseat passenger getting on/off the left side of the source vehicle 101.

FIG. 6A shows an example embodiment that uses the computer system 110 to collect data from the sensors, server, and/or Vehicle to Vehicle Communications 124 regarding the current state of source vehicle 101 and the environment external to the source vehicle 101 itself, including objects such as: other vehicles, pedestrians, road users, obstacles in the road, traffic signals, road signs, trees, etc., to project a signal 301, 302, 303 which can be projected by illumination devices or modules, preferably a projector compatible with Light Fidelity (Li-Fi) technology, to the approaching target vehicle 601. The signal 301, 302, 303 may include the dimensions 301 of the source vehicle 101, animations/pictures 302 such as: a door opening, a passenger getting off, road user crossing, etc., or words 306 such as: "Door," "Warning," "Alert," "Pedestrian," etc. The projected signs 301, 302, 303 may be placed at any distance from source vehicle 101, depending on the type, size, configuration of the source vehicle 101, and/or the environment of the source vehicle 101. For example, when the driver/passenger intends to embark or disembark the source vehicle 101 from the front-left door 211 and there is a target vehicle 601 approaching from the side of embark or disembark, in this example, on the left side of the source vehicle 101, the computer system 110 in some embodiments may project a signal 301, 302, 303 on its left side for the approaching target vehicle 601 to see or scan for information. The sensors related to sensing the intent of the driver/passenger getting on/off the source vehicle 101, for example, through the use of the exterior or interior door handle, button, or any other user interface, may send information to the computer system 110. For example, the intent of the disembark may be sensed when the door handle is opened by 1-10 degrees, measured from the interior door handle to the inside of the car door or right before the lock of the respective door is released, to project the signal 301, 302, 303. The number of degrees when the lock of the door is released may vary depending on the type and/or configuration of the source vehicle 101. If the doors of the source vehicle 101 are operated by a door button or any other user interface, the signal 301, 302, 303 may be projected as soon as the button is pressed or the computer system 110 receives a signal from the user interface. The door may open after any period of time for the driver or passenger to embark/disembark the source vehicle 101. The computer system 110 in some embodiments may determine and execute a plan of action using data received from the sensors related to sensing the intent of the driver or passenger getting on/off the source vehicle 101, to project the signal 301, 302, 303 whenever the door is used, regardless of whether or not the target vehicle 601 is approaching. The source vehicle 101 in certain embodiments can project this signal 301, 302, 303 through the illumination devices or modules either on the front-left 204, back-left 206, or both, depending on the environment of the source vehicle 101. In some embodiments, the signal 301, 302, 303 may be projected from the device or module on the back-left 206. If there is an obstacle, such as a motorcyclist, bicyclist, etc., obstructing the back-left illumination device or module 206, from projecting the signal 301, 302, 303, the source vehicle 101 may use the illumination device or module on the front-left 204 instead. If weather conditions, such as rain, fog, or sun, make the signal 301, 302, 303 difficult to see, the source vehicle 101 may use both front-left 204 and back-left 206 illumination devices or modules to project a vivid signal 301, 302, 303.

FIG. 6B shows an example embodiment when the signal 301, 302, 303 from the source vehicle 101 is projected, but the computer system 110 receives data about the environment of the source vehicle 101 that the approaching target vehicle 601 is not decreasing in speed or coming to a stop. The computer system 110 in some embodiments may turn off the projected signal 301, 302, 303 on the lane 611 and the driver/passenger of source vehicle 101 may be notified through the indicator 208, 215, 216 to wait until the target vehicle 601 has passed before getting on/off the source vehicle 101. The indicator 208, 215, 216 in certain embodiments may be inside of the vehicle, preferably located in a place that is easily viewable, hearable, and/or haptic by the driver/passenger, including but not limited to the dashboard, A, B, or C pillar, or the display screen 115 if the source vehicle 101 has a display screen. Indicators may be located anywhere on the vehicle and are not limited to the positions shown in the figures. The indicator in some embodiments may be an illuminated sign(s), a visual sign(s), an audible sound(s), and/or a haptic sign(s). This is an example for a driver or passenger getting off on the left side of the vehicle; this can also be used for a driver or passenger getting on/off on any side of the vehicle, which may vary depending on the location or place, such as: country or city, the vehicle is manufactured or purchased.

Figure 7:
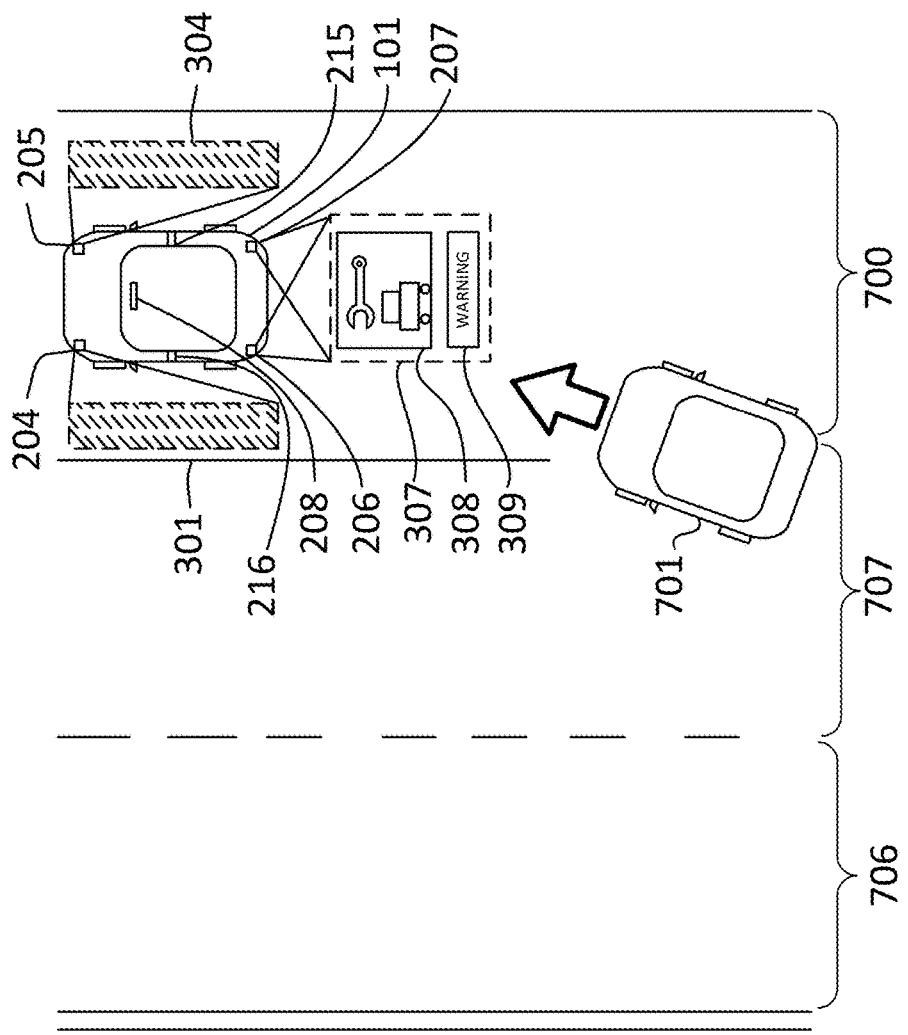
FIG. 7 is an example of a signaling device in an operating scenario, when a vehicle is in a parked or stop situation, according to the elements of this disclosure.

FIG. 7 shows an example of a parked or stopped vehicle on the shoulder road 700 such as a freeway, highway, or local road. If the source vehicle 101 is in a situation such as a flat tire, a car breakdown, a ticket write-up, or a break for long drives, where pulling up or parking on a shoulder road 700 is necessary, the driver or computer system 110 of the source vehicle 101 in some embodiments may turn on the signaling system that may alert other vehicles on the road. In some embodiments, the computer may take into other vehicle status information, such as the gear the vehicle is in. In some examples, such projections may be generated when the hazard lights are selected and the vehicle is in park.

In some examples, the target vehicle 701 may approach the road shoulder 700, where the source vehicle 101 is in a parked or stopped situation. If the source vehicle 101 in some embodiments is in situations where pulling up on a shoulder road is necessary, and the driver turns on the signaling system or the computer system 110 receives data from the sensors, server, and/or Vehicle to Vehicle Communications 124 about the current state of the source vehicle 101 and/or the environment of the source vehicle 101 that turning on the signaling system is necessary, the computer system 110 may determine and execute a plan of action to project, for example, three signs: one from the left side 301 projected by illumination device or module 204, one from the right side 304 projected by illumination device or module 205, and one from behind 307, 308, 309 projected by illumination devices or modules 206, 207. The dimensions 301, 304, 307 in some embodiments may include animations/pictures and/or words. For example, the rear dimension 307 may include animations/pictures 308 such as: a signal of a car being repaired, etc. and/or words 309 such as: "Repair," "Warning," "Alert," etc. The projected signs 301, 304, 307 can be placed at any distance, preferably at a distance of more than one meter, from the source vehicle 101, however, the preferable distance may vary depending on the type, size, configuration of the source vehicle 101, and/or the environment of the source vehicle 101. If the driver or the computer system 110 determines that it is no longer necessary to park or stop in the shoulder road 700, the driver may command the computer system 110 to turn off the signal 301, 304, 307, 308, 309 or the computer system 110 may determine and execute a plan of action to turn off the signs 301, 304, 307, 308, 309.

If the signal 301, 304, 307, 308, 309 from the source vehicle 101 is projected, but the computer system 110 in certain embodiments receives data about the environment of the source vehicle 101 that the approaching target vehicle 701 is not decreasing in speed or coming to a stop, computer system 110 may determine and execute a plan of action to turn off the projected signal 301, 304, 307, 308, 309 on the shoulder road 700, and the driver/passenger of the source vehicle 101 may be notified through the indicator 208, 215, 216 and/or horn. The indicator(s) 208, 215, 216 in certain embodiments may be placed inside of the vehicle, preferably located in a place that is easily viewable, hearable, and/or haptically perceivable by the driver/passenger, including but not limited to the dashboard, A, B, or C pillar(s), or the display screen 115 if the source vehicle 101 has a display screen. Indicators may be located anywhere on the vehicle and are not limited to the positions shown in the figures and may also be placed external to the source vehicle 101. The indicator can be an illuminated sign(s), a visual sign(s), an audible sound(s), and/or a haptic sign(s). For example, a situation in which this signaling method would be useful is if a police car is on the shoulder road 700 and the police officer is issuing a ticket to the other vehicle, the police officer may be focused on writing up the ticket and may not notice the rear-approaching target vehicle 701. Thus, when the computer system 110 receives data from the sensors that the target vehicle 701 has not decreased in speed or come to a stop, the police car may indicate to the police officer through audible sounds such as the horn, or flashing high beams so that the police officer may be able to notice and avoid the approaching target vehicle 701. FIG. 7 shows an exemplary situation that may occur on a shoulder road, however, this figure pertains to any similar place, or any other type of space on a road.

Figure 8A:
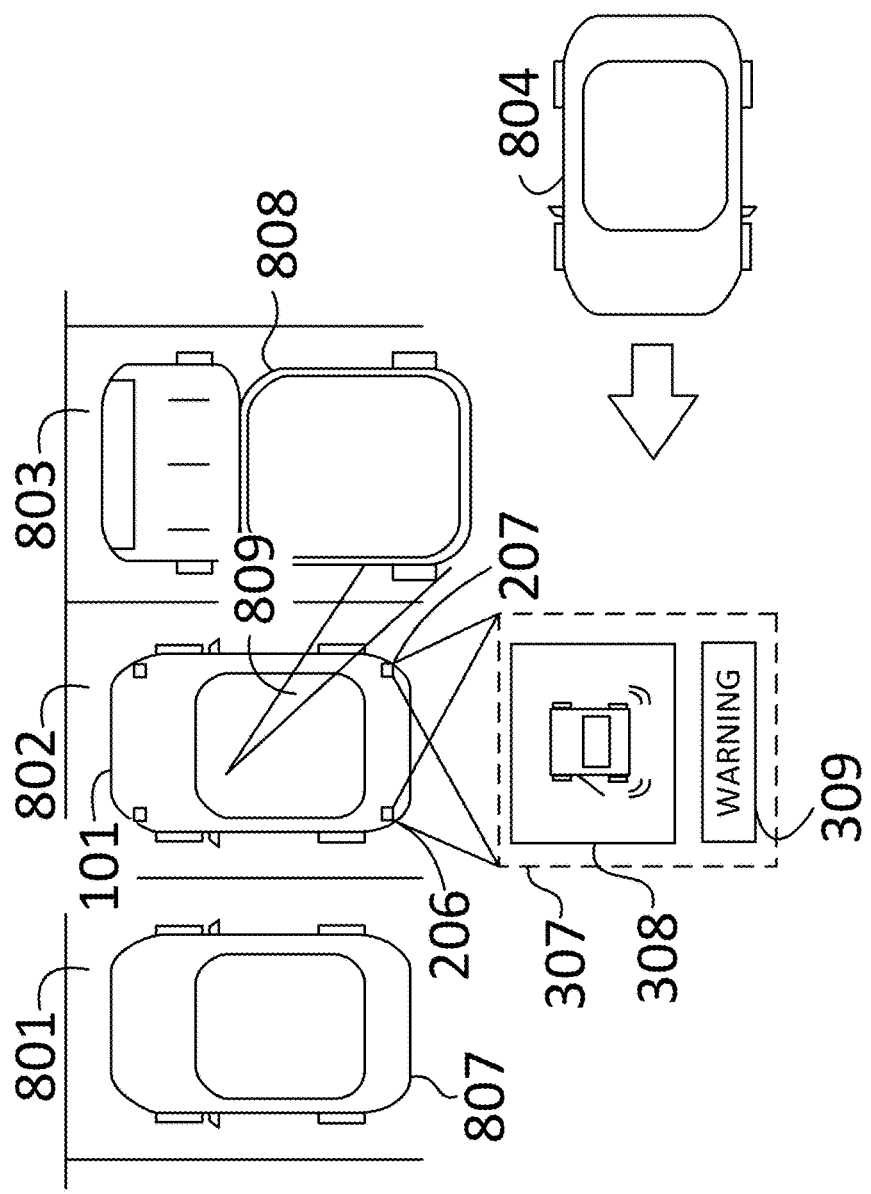
FIGS. 8A and 8B are an example of a signaling device in an operating scenario, when a vehicle is coming out of a parking space, according to the elements of this disclosure.

FIG. 8A shows an example situation showing the source vehicle 101 coming out a parking space 802 rear-first. For example, the source vehicle 101 is in the middle parking space 802, along with two other vehicles on its left-side 807 and right-side 808, of which the vehicle on the right side is a truck in this example. With the intent to back-up out of the parking space 802, the source vehicle 101 may not be able to see objects in the road, such as target vehicle 804, approaching the source vehicle 101 from the back right, due to the blind spot 809 created by vehicle 808. The target vehicle 804 may include any other type of vehicle such as a car, truck, bus, motorcycle, etc.; personal transportation vehicles or devices such as Segways, etc.; road users such as bicyclists, pedestrians, etc.; or any other vehicle or machine that may be mobilized. The computer system 110 in some embodiments may collect data from the sensors, server, and/or Vehicle to Vehicle Communications 124 regarding the state of the environment external to the source vehicle 101 itself, including objects such as: other vehicles, pedestrians, road users, obstacles in the road, traffic signals, road signs, trees, etc., to project a signal 307, 308, 309 which can be projected by illumination devices or modules, preferably a projector compatible with Light Fidelity (Li-Fi) technology, to an approaching target vehicle 804. In some embodiments, changing to a reverse gear indicates to the computer the intent to back up, thus turning on the sensors in the rear of the vehicle and the projector(s) in the rear of the vehicle.

Such an example projected signal 307, 308, 309 may include the dimensions 307 of the source vehicle 101, animations/pictures 308 such as: a car backing up, moving arrows, etc., or words 309 such as "Warning," "Car Coming Out," "Alert," etc. The projected signs 307, 308, 309 in certain embodiments may be placed at any distance from source vehicle 101, depending on the type, size, configuration of the source vehicle 101, and/or the environment of the source vehicle 101. If the computer system 110 of the source vehicle 101 receives data from the sensors, server, and/or Vehicle to Vehicle Communications 124 that there is an approaching target vehicle 804, the computer system 110 can determine and execute a plan of action to project a signal 307, 308, 309 for the driver or computer system of the target vehicle 804 to see or scan for information. The computer system 110 in some embodiments may determine and execute a plan of action using data received from the sensors related to sensing the intent of the driver or computer system 110 in the source vehicle 101 coming out of the parking space 802 head-first or back-first, to project the signal 307, 308, 309 whenever the source vehicle 101 is coming out from a parking space, regardless of whether or not the target vehicle 804 is approaching. In this example, the signal 307, 308, 309 may be projected from either illumination device or module from the back-left side 206, back-right side 207, or from both, depending on the environment of the source vehicle 101. In some embodiments, the signal 307, 308, 309 can be projected from the illumination device or module on the back-left 206, however, if there is an obstacle obstructing the back-left illumination device or module 206 such as a motorcyclist, bicyclist, etc., from illuminating its projection out, the source vehicle 101 can use the back-right illumination device or module 207 instead. If weather conditions such as rain, fog, or sun, make the signal 307, 308, 309 difficult to see, the source vehicle 101 can use both the back-left 206 and back-right 207 illumination devices or modules to project a vivid signal 307, 308, 309. This may also be used for a vehicle coming out of a parking space back-in head-out. In this case, the source vehicle 101 may use the illumination devices or modules in the front-left 204, front-right 205, or both, to alert the target vehicle 804 that the source vehicle 101 is coming out of a parking space head-first.

Figure 8B:
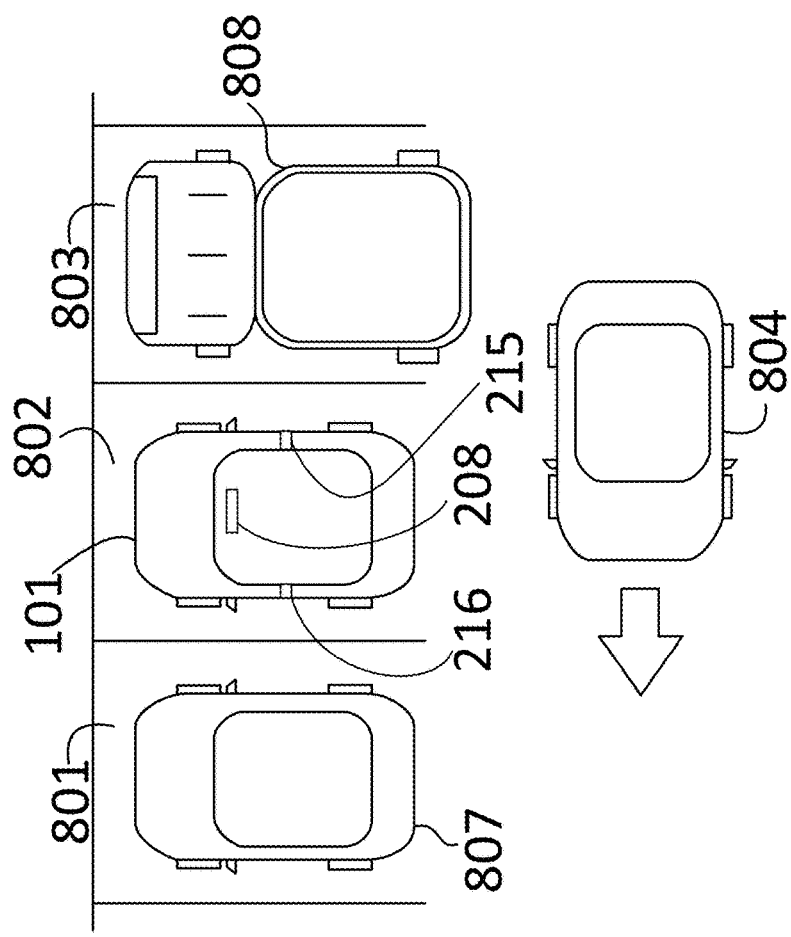

FIG. 8B shows an example situation where the signal 307, 308, 309 from the source vehicle 101 is projected, but the computer system 110 receives data about the environment of the source vehicle 101 that the approaching target vehicle 804 is not decreasing in speed or coming to a stop. The computer system 110 in some embodiments may determine and execute a plan of action to turn off the projected signal 307, 308, 309 and the driver of source vehicle 101 may be notified through the indicator 208, 215, 216 to wait until the target vehicle 804 has passed before coming out of the parking space 802. The indicator 208, 215, 216 may be inside of the vehicle, preferably located in a place that is easily viewable, hearable, and/or haptically perceivable by the driver including but not limited to the dashboard, A, B, or C pillar(s), or the display screen 115 if the source vehicle 101 has a display screen. Indicators may be located anywhere on the vehicle and are not limited to the positions shown in the figures. The indicator in certain embodiments may be an illuminated sign(s), a visual sign(s), an audible sound(s), and/or a haptic sign(s).

DRIVING SURFACE EXAMPLES

FIGS. 9A and 9B show example situations where the source vehicle 101 is at a four-way intersection. The source vehicle 101 is shown at an intersection in the rightmost lane 905 with the intent to turn right onto lane 906. There is also a target vehicle 901 in lane 906, intending to cross the intersection. There may be a possibility of a collision between the source vehicle 101 and target vehicle 901 due to the blind spot 903 caused by the third party vehicle 902 in the left lane 904. The target vehicle 901 may include any other-type of vehicle such as a car, truck, bus, motorcycle, etc.; personal transportation vehicles or devices such as Segways, etc.; road users such as bicyclists, pedestrians, etc.; or any other vehicle or machine that may be mobilized.

FIG. 9A shows an example embodiment where the computer system 110 collects data from the sensors, server, and/or Vehicle to Vehicle Communications 124 regarding the state of the environment external to the source vehicle 101 itself, including objects such as: other vehicles, pedestrians, road users, obstacles in the road, traffic signals, road signs, trees, etc., to project a signal 310, 311, 312, which can be projected by illumination devices or modules, preferably a projector compatible with Light Fidelity (Li-Fi) technology, to an approaching target vehicle 901. The signal 310, 311, 312 may include the dimensions 310 of the source vehicle 101, animations/pictures 311 such as: arrows, a car turning, etc., or words 312 such as: "Turn," "Warning," "Alert," etc. The projected signs 310, 311, 312 can be placed at any distance from the source vehicle 101, depending on the type, size, configuration of the source vehicle 101, and/or the environment of the source vehicle 101. When the computer system 110 of source vehicle 101 receives data from the sensors, server, and/or Vehicle to Vehicle Communications 124 that there is a target vehicle 901 approaching in the lane 906, the source vehicle 101 can determine and execute a plan of action to project a signal 310, 311, 312 in the lane 906 for the driver or computer system of the target vehicle 901 to see or scan for information. The computer system 110 in certain embodiments may determine and execute a plan of action using data received from the sensors, server, Vehicle to Vehicle Communications 124 and/or its global positioning system 120 with data 114 such as detailed maps in its memory 112 to determine if the source vehicle 101 is at an intersection, to project the signal 310, 311, 312 whenever the source vehicle 101 is at the location shown in FIG. 9A, regardless of whether or not the target vehicle 901 is approaching. This example signal 310, 311, 312 may be projected from either illumination device or module from the front-left 204, front-right 205, or from both, depending on the environment of the source vehicle 101. In some embodiments, the signal 310, 311, 312 can be projected from the illumination device or module on the front-right 205, however, if there is an obstacle obstructing the front-right illumination device or module 205 such as a motorcyclist, bicyclist, etc., from illuminating its projection out, the source vehicle 101 can use the front-left illumination device or module 204 instead. If weather conditions such as rain, fog, or sun, make the signal 310, 311, 312 difficult to see, the source vehicle 101 can use both the front-left 204 and front-right 205 illumination devices or modules to project a vivid signal 310, 311, 312.

FIG. 9B shows an example situation where the signal 310, 311, 312 from the source vehicle 101 is projected, but the computer system 110 receives data about the environment of the source vehicle 101 that the approaching target vehicle 901 is not decreasing in speed or coming to a stop. The computer system 110 may determine and execute a plan of action to turn off the projected signal 310, 311, 312 and the driver of source vehicle 101 may be notified through the indicator 208, 215, 216 to wait until the target vehicle 901 has passed before completing the right turn onto lane 906. The indicator 208, 215, 216 in certain embodiments may be inside of the vehicle, preferably located in a place that is easily viewable, hearable, and/or haptically perceivable by the driver, including but not limited to the dashboard, A, B, or C pillar(s), or the display screen 115 if the source vehicle 101 has a display screen. Indicators may be located anywhere on the vehicle and are not limited to the positions shown in the figures. The indicator in certain embodiments may be an illuminated sign(s), a visual sign(s), an audible sound(s), and/or a haptic sign(s).

Although this exemplary figure shows the source vehicle 101 turning right into the lane 906, this may apply to any other type of turn, road configuration, road design, or traffic conditions.

Figure 10:
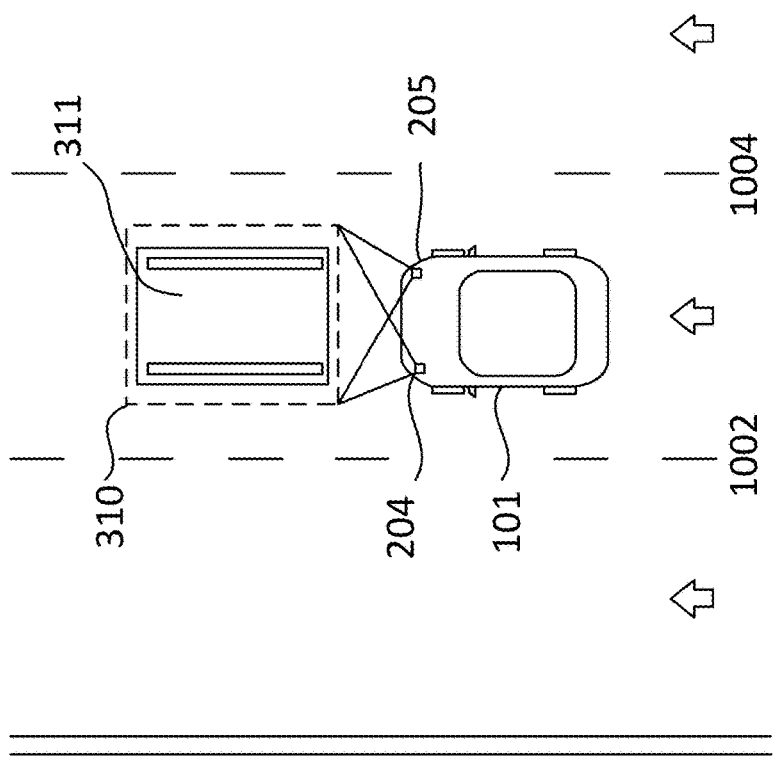
FIG. 10 shows an example of a signaling device in an operating scenario, when a vehicle uses illumination devices or modules for driving support, according to the elements of this disclosure.

FIG. 10 shows an example embodiment of an illumination device or module that aids in driving support for the source vehicle 101 when road surface markings may be indistinct due to situations including but not limited to weather conditions or wear from use. This signaling system in certain embodiments can be either manually turned on/off by the driver or automatically set. FIG. 10 shows an example when source vehicle 101 is driving on a road with indistinct road surface markings 1002, 1004 due to rainy weather. The driver or computer system 110 of the source vehicle 101 in certain embodiments may turn on the lane assistance, in which the computer system may use data from its sensors, server, Vehicle to Vehicle Communications 124 and/or its global positioning system 120 with a lane recognition algorithm to project a laser on or near the road markings 1002, 1004. The computer system 110 may then determine and execute a plan of action to project a signal 310, 311 using the illumination devices or modules from the front-left 204 and front-right 205, to distinctly show the driver the road surface markings 1002, 1004. The signal 310, 311 in certain embodiments may include the dimensions 310 of the source vehicle 101 or animations/pictures 311 such as: straight lines, curved lines, dotted lines, etc. The projected signs 310, 311 in certain embodiments can be placed at any distance from source vehicle 101, depending on the type, size, configuration of the source vehicle 101, and/or the environment of the source vehicle 101.

FIG. 11 shows an example situation where the source vehicle 101 is turning at a T-intersection. The source vehicle is at a T-intersection with the intent to make a left turn into the lane 1107 from the lane 1105. However, due to the blind spot 1108 created by object 1102, for example, a parked car on the road 1106 and/or object 1103, in this case, for example, a grove or bushes, the source vehicle 101 may not see the target vehicle 1101 intending to continue onto the lane 1106 after the intersection. The target vehicle 1101 may include any other type of vehicle such as a car, truck, bus, motorcycle, etc.; personal transportation vehicles or devices such as Segways, etc.; road users such as bicyclists, pedestrians, etc.; or any other vehicle or machine that may be mobilized. The computer system 110 in certain embodiments may collect data from the sensors, server, and/or Vehicle to Vehicle Communications 124 regarding the state of the environment external to the source vehicle 101 itself, including objects such as: other vehicles, pedestrians, road users, obstacles in the road, traffic signals, road signs, trees, etc., to project a signal 310, 311, 312, which can be projected by illumination devices or modules, preferably a projector compatible with Light Fidelity (Li-Fi) technology, to an approaching target vehicle 1101. The signal 310, 311, 312 in certain embodiments may include the dimensions 310 of the source vehicle 101, animations/pictures 311 such as: arrows, a car turning, etc., or words 312 such as: "Turn," "Warning," "Alert," etc. The projected signs 310, 311, 312 can be placed at any distance from source vehicle 101, depending on the type, size, configuration of the source vehicle 101, and/or the environment of the source vehicle 101. When the computer system 110 of source vehicle 101 in certain embodiments receives data from the sensors, server, and/or Vehicle to Vehicle Communications 124 that there is a target vehicle 1101 approaching, for example, from the lane 1106, the source vehicle 101 can determine and execute a plan of action to project a signal 310, 311, 312 for the driver or computer system of the target vehicle 1101 to see or scan for information. When the source vehicle 101 is at a T-intersection, the computer system 110 in certain embodiments may determine and execute a plan of action using data received from the sensors, server, Vehicle to Vehicle Communications 124 and/or its global positioning system 120 with data 114 such as detailed maps in its memory 112, to determine to project the signal 310, 311, 312 whenever the source vehicle 101 is at the location shown in FIG. 11, regardless of whether or not a target vehicle 1101 is approaching. This signal 310, 311, 312 in certain embodiments may be projected from either illumination device or module from the front-left 204, front-right 205, or from both, depending on the environment of the source vehicle 101. In some embodiments, the signal 310, 311, 312 can be projected from the illumination device or module on the front-right 205, however, if there is an obstacle obstructing the front-right illumination device or module 205 such as a motorcyclist, bicyclist, etc., from illuminating its projection out, the source vehicle 101 can use the illumination device or module on the front-left 204 instead. If weather conditions such as rain, fog, or sun, make the signal 310, 311, 312 difficult to see, the source vehicle 101 can use both the front-left 204 and front-right 205 illumination devices or modules to project a vivid signal 310, 311, 312.

If the signal 310, 311, 312 from the source vehicle 101 in certain embodiments is projected, but the computer system 110 receives data about the environment of the source vehicle 101 that the approaching target vehicle 1101 is not decreasing in speed or coming to a stop, the computer system 110 may determine and execute a plan of action to turn off the projected signal 310, 311, 312 and the driver of source vehicle 101 may be notified through the indicator 208, 215, 216 to wait until the target vehicle 1101 has passed before completing the left turn onto the lane 1107. The indicator 208, 215, 216 in certain embodiments may be inside of the vehicle, preferably located in a place that is easily viewable, hearable, and/or haptically perceivable by the driver, including but not limited to the dashboard, A, B, or C pillar(s), or the display screen 115 if the source vehicle 101 has a display screen. Indicators could be located anywhere on the vehicle and are not limited to the positions shown in the figures. The indicator can be an illuminated sign(s), a visual sign(s), an audible sound(s), and/or a haptic sign(s).

Although this exemplary figure shows the source vehicle 101 turning left into the lane 1107, this may apply to any other type of turn, road configuration, road design, or traffic conditions.

FIG. 12 shows an example computer hardware 1200 that may be used to practice the embodiments described here. Such computer hardware may be integrated into a vehicle as a modular unit or units, or could be integrated into a vehicle during manufacture. The aspects of the computer device 1200 may not be located in one place but may be integrated into different aspects of a vehicle. The example computer device may include a computer processing unit 1210 which communicates by a bus or other communication path 1212 with other computing components such as a user interface 1214. The user interface may include a display 1218 and an input 1216. The display 1218 could be a flat touch screen that could double as an input 1216. The input could also be a button, knob, switch, keyboard, dial, roller, wheel, voice activation, gesture recognition, or other human interfacing input system. The input 1216 may be located in various parts of a vehicle, for example having a flat panel display/input on a dashboard of a car that also works with a wheel and two buttons on a steering wheel. More knobs and buttons may be located on the dashboard as well as an interactive voice operated system through microphones and speakers. Any combination of these displays 1218 and input systems 1216 may be used. Other computer components shown in FIG. 12 include a network interface 1220. This interface may allow the computer to contact other computers and networks such as the internet and may include wireless technology such as cellular, WiFi, Bluetooth Low Energy, satellite communication or other communication system including a combination of these. The system also includes peripherals 1224 which could include any number of peripheral features that may be controlled by the computer 1200 including but not limited to various sensors 1228 as described here, antennae 1226 for communication or emitting radiation according to the descriptions here, radar 1284 which may also utilize an antenna or array of antennae, laser light emitting systems 1230, camera 1286 which may form part of a LIDAR system as described here, speakers 1280, other light systems 1282 such as light emitting diodes (LED) or halogen light systems, and any other device described herein. The computer system 1200 may also include a memory 1222 which could be used to execute instructions and/or code to run any of various software on the computer 1200. Examples include but are not limited to an operating system 1232, a network communication module 1234, instructions 1236, applications 1238 such as sending/receiving message data 1240 and sensor operation 1242 as described here. Other features may include data storage 1258, data tables 1260, transaction logs 1262, user data 1264 and encryption data 1270.

Software, hardware, and a combination of both may be used on any of various arrangements of such computer components to practice the embodiments described here.

Figure 13:
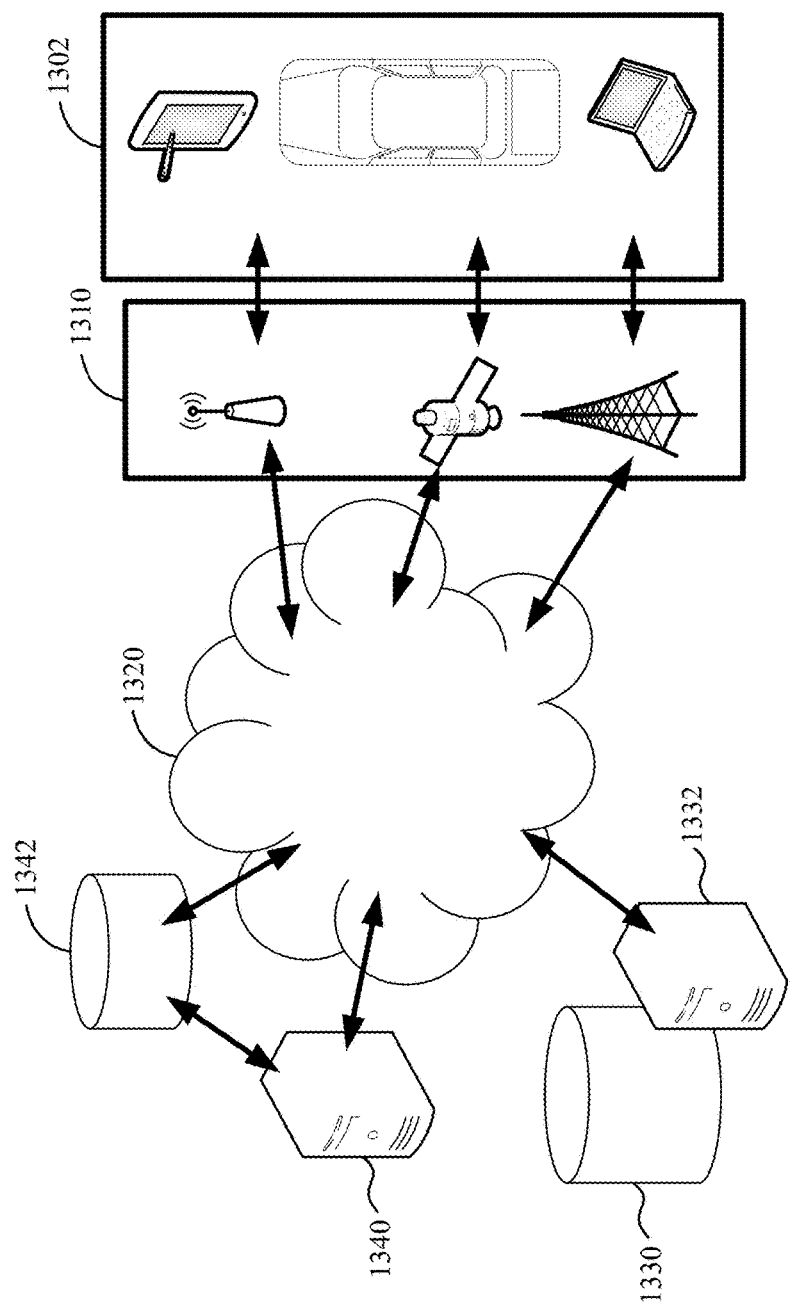
FIG. 13 shows an example network that may be used to practice the embodiments according to the elements of this disclosure.

FIG. 13 shows an example network that may be used to practice the embodiments described herein. In the example, any of various networked computer devices 1302 are shown including vehicles, smartphones, tablet computers, laptop computers, etc. These computing devices are in communication 1310 with a network 1320 such as the internet. The wireless communications 1310 could be any number of communication systems including but not limited to cellular, WiFi, Bluetooth Low Energy, satellite or any other kind of communication system. FIG. 13 also shows example back end systems 1332 such as a server or multiple servers. Also shown are data storages 1330 which may be local or servers 1340 that are distributed with distributed storage 1342. In any arrangement, the back end systems 1332, 1340, may communicate with the computing systems 1302 such as those in the vehicles in order to send and receive data such as sensor data, diagnostic data, travel data, data logs, audio or video data, LIDAR data, position data, or any other kind of information that the back end systems may utilized for analysis. The back end systems 1332, 1340 may also be used to load updates to the networked systems 1302, push fixes to bugs or other computer maintenance files. The back end systems 1332, 1340 could push traffic data to the computers 1302.

INTERCONNECTABILITY

In some embodiments, vehicles described here may include the ability to communicate with one another, sometimes referred to as Vehicle-to-Vehicle communications. In such a way, they may be able to integrate their understanding of their sensed surroundings and share information wirelessly which can then be integrated by the vehicle into a bigger picture of the overall environment, even beyond what environmentals the individual vehicle can sense at any given time. This over-the-horizon information could be used by an autonomous vehicle to make driving decisions.

Such communication systems such as cellular, satellite, Wi-Fi, Bluetooth Low Energy, or any other kind of communication system may be used to interface with other vehicles and/or a back end system that could be used to coordinate information.

Referring again to FIG. 13, in some embodiments, the back end systems 1332, 1340 may be used to link computers 1302 to others, for instance, link multiple vehicles which are operating near one another at a given time. Such live linking may allow for sensor data to be shared among operators of the vehicles or computers within the vehicles 1302. Such linking could allow for one vehicle 1302 to receive data on traffic patterns beyond visual range including slow areas, accidents, or construction work. Such linking could allow vehicles to communicate to one another their intention to turn, lane change, or otherwise change position relative to one another.

CONCLUSION

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The innovations herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the innovations herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via or performed by logic and/or logic instructions including program modules, executed in association with such components or circuitry, for example. In general, program modules may include routines, programs, objects, components, data structures, etc. that performs particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

What is claimed is:

1. A system comprising:
   a computer in communication with a sensor mounted on a first vehicle, the sensor configured to send information to the computer regarding sensed environmental obstacles;
   a projector in communication with the computer, the projector mounted on the first vehicle and configured to project a light image onto a driving surface adjacent to the first vehicle, wherein the projected light image is the same dimensions as the first vehicle, and wherein the light image is based on a computer analysis of the sensed environmental obstacles.

2. The system of claim 1 wherein the projected light image changes based on the sensed environmental obstacles.

3. The system of claim 2 wherein an internal warning in the first vehicle indicates the sensed environmental obstacles.

4. The system of claim 2 wherein the change to the projected light image is to change the color of the light.

5. The system of claim 1 wherein the sensed environmental obstacles include one or more moving vehicles and the computer determines a sensed speed of the one or more moving vehicles.

6. The system of claim 1 wherein the light projector projects the light image in a direction based on the sensed environmental obstacles.

7. The system of claim 6 wherein the sensed environmental obstacles are both a pedestrian and a particular moving vehicle and the projected light image is directed in front of the particular moving vehicle.

8. The system of claim 1 wherein the light image is an indication of the space the first vehicle being driven.

9. The system of claim 1 wherein the sensor senses a movement of a door handle and the light image is an indication that the door with the door handle is opening.

10. A computerized method comprising:
    by a computer with a processor and a memory in communication with a plurality of sensors and a plurality of projectors mounted on a first vehicle,
    receiving sensor data from the plurality of sensors;
    sending data to at least one of the plurality of projectors causing the projector to project a light image onto a driving surface adjacent to the first vehicle, wherein the projected light image is the same dimensions as the first vehicle.

11. The method of claim 10 wherein the projector is a laser light projector and the sensor is a LIDAR system.

12. The method of claim 10 wherein the light image is an indication that the first vehicle being driven is going to turn or change lanes.

13. The method of claim 10 wherein the projected light image is projected when the vehicle hazard lights are selected.

14. The method of claim 10 wherein the projected light image is projected behind the vehicle when the vehicle is put into reverse gear.

* * * * *